United States Patent
Murakami

(10) Patent No.: US 9,637,196 B2
(45) Date of Patent: May 2, 2017

(54) VEHICLE HEIGHT ADJUSTMENT APPARATUS

(71) Applicant: Showa Corporation, Gyoda-shi (JP)

(72) Inventor: Yosuke Murakami, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/850,344

(22) Filed: Sep. 10, 2015

(65) Prior Publication Data
US 2016/0272272 A1 Sep. 22, 2016

(30) Foreign Application Priority Data
Mar. 20, 2015 (JP) ................................ 2015-057706

(51) Int. Cl.
 *B60G 17/027* (2006.01)
 *B60G 17/015* (2006.01)
 (Continued)

(52) U.S. Cl.
 CPC ............ *B62K 25/04* (2013.01); *B60G 17/015* (2013.01); *B60G 17/0272* (2013.01);
 (Continued)

(58) Field of Classification Search
 CPC B60G 17/0272; B60G 17/027; B60G 17/015; B60G 17/0565; B60G 17/00;
 (Continued)

(56) References Cited

U.S. PATENT DOCUMENTS

| 8,262,100 B2 * | 9/2012 | Thomas .................... F16F 9/56 188/321.11 |
|---|---|---|
| 2006/0230758 A1 | 10/2006 | Tagata et al. |
| 2014/0001716 A1 | 1/2014 | Murakami et al. |
| 2014/0077465 A1 | 3/2014 | Murakami et al. |

(Continued)

FOREIGN PATENT DOCUMENTS

| EP | 1662171 A | 5/2006 |
|---|---|---|
| JP | 08-022680 B | 3/1996 |
| JP | 2015-058844 A | 3/2015 |

OTHER PUBLICATIONS

U.S. Appl. No. 14/836,394, Murakami.
Extended European Search Report mailed Aug. 22, 2016 for the corresponding European Patent Application No. 15187032.6.

*Primary Examiner* — Keith Frisby
(74) *Attorney, Agent, or Firm* — Leason Elli LLP

(57) ABSTRACT

A vehicle height adjustment apparatus includes a spring, an adjustor, a storage chamber, a pump, and a flow path switching unit. The adjustor includes an accommodation chamber which accommodates liquid, and adjusts the length of the spring according to the amount of liquid in the accommodation chamber. The pump includes a cylinder. The flow path switching unit includes a first communication path through which the inside of the cylinder communicates with the storage chamber, a second communication path through which the inside of the cylinder communicates with the accommodation chamber, and a third communication path through which the accommodation chamber communicates with the storage chamber. The flow path switching unit switches the flow path of the liquid according to an amount of electric current supplied to the flow path switching unit.

14 Claims, 11 Drawing Sheets

(51) Int. Cl.
*B62K 25/04* (2006.01)
*B60G 17/056* (2006.01)
*B62K 25/08* (2006.01)
*B60G 17/044* (2006.01)
*F16F 1/12* (2006.01)
*B60G 17/048* (2006.01)

(52) U.S. Cl.
CPC ......... *B60G 17/044* (2013.01); *B60G 17/048* (2013.01); *B60G 17/0565* (2013.01); *B62K 25/08* (2013.01); *F16F 1/121* (2013.01); *B60G 2202/413* (2013.01); *B60G 2202/414* (2013.01); *B60G 2300/12* (2013.01); *B60G 2500/302* (2013.01); *B60G 2500/322* (2013.01); *B60G 2800/914* (2013.01); *B62K 2025/044* (2013.01); *B62K 2025/045* (2013.01)

(58) Field of Classification Search
CPC ............ B60G 2300/12; B60G 2500/30; B60G 2500/302; B60G 2800/914; B62K 2025/044; B62K 2025/045
USPC ............ 280/5.5, 5.504, 5.514, 6.157; 701/37
See application file for complete search history.

(56) References Cited

U.S. PATENT DOCUMENTS

| | | | |
|---|---|---|---|
| 2014/0167371 A1* | 6/2014 | Murakami | B62K 25/08 280/5.514 |
| 2015/0076773 A1 | 3/2015 | Kasuga et al. | |
| 2015/0273970 A1* | 10/2015 | Ishikawa | B60G 17/0152 701/37 |

* cited by examiner

VEHICLE HEIGHT ADJUSTMENT APPARATUS

CROSS-REFERENCE TO RELATED APPLICATIONS

This application is based on and claims priority under 35 USC 119 from Japanese Patent Application No. 2015-057706 filed on Mar. 20, 2015, the content of which is incorporated herein by reference.

BACKGROUND OF THE INVENTION

1. Field of the Invention

The present invention relates to a vehicle height adjustment apparatus that adjusts the vehicle height of a two-wheeled motorized vehicle.

2. Description of Related Art

In recent years, there is proposed an apparatus that increases the vehicle height of a two-wheeled motorized vehicle while travelling and decreases the vehicle height in order for a driver to easily get on and off the two-wheeled motorized vehicle at a stop.

For example, a vehicle height adjustment apparatus disclosed in JP-B-H08-22680 automatically changes the vehicle height of a two-wheeled motorized vehicle in response to the vehicle speed of the two-wheeled motorized vehicle. The vehicle height adjustment apparatus automatically raises the vehicle height when the vehicle speed reaches a set speed, and automatically lowers the vehicle height when the vehicle speed reaches a vehicle speed which is lower than or equal to the set speed. An electromagnetic actuator operates so as to adjust the vehicle height. For example, in a case where a switch is set to be automatically turned on when the vehicle speed reaches the set speed such that the electromagnetic actuator operates, the vehicle height is raised when the vehicle speed reaches the set speed. In contrast, in a case where the switch is set to be automatically turned off when the vehicle speed reaches a vehicle speed which is lower than or equal to the set speed, the vehicle height is lowered when the vehicle speed reaches a vehicle speed which is lower than or equal to the set speed.

SUMMARY OF THE INVENTION

The vehicle height adjustment apparatus preferably can switch between three modes: a raising mode in which the vehicle height is raised; a lowering mode in which the vehicle height is lowered; and a maintaining mode in which the vehicle height is maintained. However, when the vehicle height adjustment apparatus is configured so as to be able to switch between the three modes, the configuration of the vehicle height adjustment apparatus becomes complicated and the exterior dimension is increased. Hence, in particular, when the vehicle height adjustment apparatus is applied to a front fork which has a limited surrounding space, desirably, the configuration is simplified and a mounting space is reduced.

An object of the present invention is to provide a vehicle height adjustment apparatus that can switch between a raising mode, a lowering mode, and a maintaining mode, and can reduce a mounting space.

According to an aspect of the invention, there is provided a vehicle height adjustment apparatus including: a spring having one end supported at a side of a body of a vehicle and another end supported at a side of a wheel of the vehicle; an adjustor that has an accommodation chamber which accommodates liquid, and adjusts the length of the spring according to the amount of liquid in the accommodation chamber; a storage chamber that stores the liquid; a pump that includes a cylinder, suctions the liquid in the storage chamber into the cylinder when the relative distance between the body of the vehicle and the wheel increases, and discharges the liquid in the cylinder when the relative distance between the body of the vehicle and the wheel decreases; and a flow path switching unit that includes a first communication path through which the inside of the cylinder communicates with the storage chamber; a second communication path through which the inside of the cylinder communicates with the accommodation chamber; and a third communication path through which the accommodation chamber communicates with the storage chamber, and switches the flow path of the liquid between the first communication path, the second communication path and the third communication path according to the amount of the electric current supplied to the flow path switching unit.

In this case, the flow path switching unit may have a second communication path opening and closing valve that is disposed on the second communication path, allows the liquid to flow into the accommodation chamber from the cylinder, and prevents the liquid from flowing into the cylinder from the accommodation chamber. According to an amount of electric current supplied to the flow path switching unit, the flow path switching unit may switch between a state in which the first communication path is opened, and the third communication path is closed; a state in which the first communication path and the third communication path are closed; and a state in which the first communication path is closed, and the third communication path is opened.

In this case, the flow path switching unit may further include: a solenoid that has an operation rod that protrudes from a case by an amount (protrusion amount) that is changed according to the amount of the electric current supplied to the flow path switching unit and a plate-like valve which is attached to the operation rod; a valve body that rests on a resting surface; and a push rod which is pushed by the operation rod of the solenoid such that the push rod moves. When the amount of protrusion of the operation rod of the solenoid from the case is greater than or equal to a first reference amount, the operation rod may protrude to a position in which the valve closes the first communication path. When the amount of protrusion of the operation rod of the solenoid from the case is greater than or equal to a second reference amount predetermined to be greater than the first reference amount, the push rod may be pushed by the operation rod, may push the valve body such that the valve body moves away from the resting surface, and thus the third communication path may be opened.

When the amount of protrusion of the operation rod of the solenoid from the case is less than the first reference amount, the flow path switching unit may open the first communication path, and guide the liquid, which is discharged by the pump, to the storage chamber.

In this case, the push rod may receive the pressure of the liquid discharged by the pump so that the push rod moves in a direction to push the valve body (push direction).

In this case, a pressure receiving area of the push rod may be equal to a pressure receiving area of the valve body, or the pressure receiving area of the valve body may be larger than the pressure receiving area of the push rod, with the pressure receiving area of the push rod receiving a force that is applied to the push rod in the push direction because the liquid is discharged by the pump, and with the pressure receiving area of the valve body receiving a force that is applied to the valve body in contact with the resting surface in the direction opposite to the push direction.

According to the present invention, it is possible to switch between the raising mode, the lowering mode, and the maintaining mode, and to reduce a mounting space.

DESCRIPTION OF EMBODIMENTS

Hereinafter, an embodiment of the present invention will be described in detail with reference to the accompanying drawings.

Figure 1:
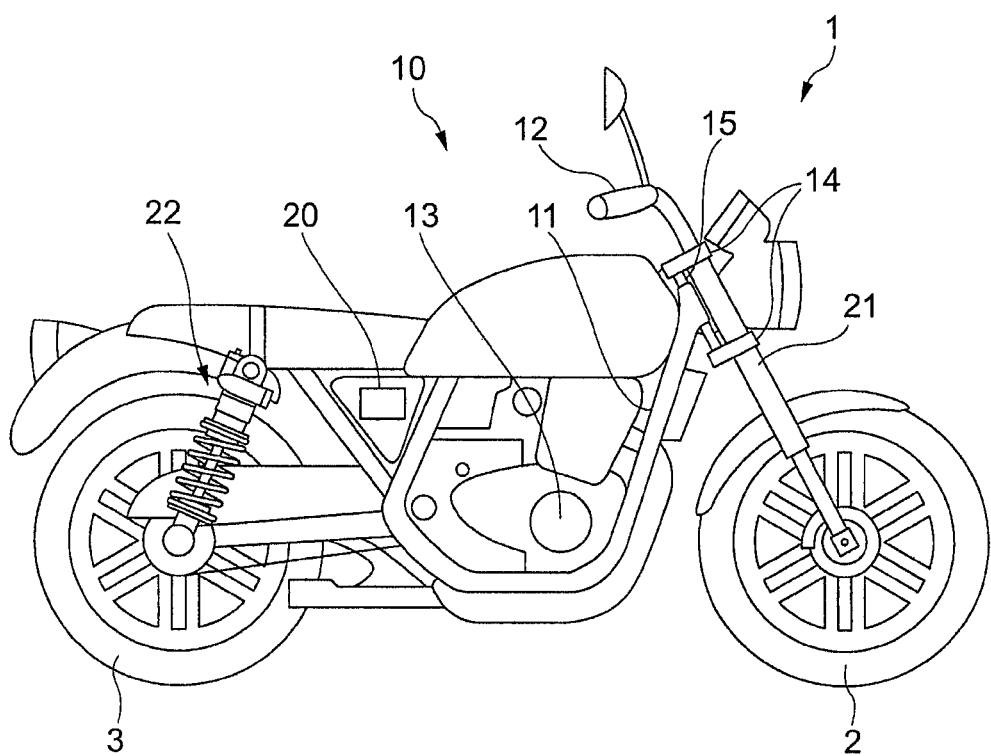
FIG. 1 is a view illustrating the schematic configuration of a two-wheeled motorized vehicle according to an embodiment.

FIG. 1 is a view illustrating the schematic view of a two-wheeled motorized vehicle 1 according to the embodiment.

The two-wheeled motorized vehicle 1 includes a front wheel 2 that is a wheel on the front side; a rear wheel 3 that is a wheel on the rear side; and a vehicle main body 10 that includes a vehicle body frame 11 which is the frame of the two-wheeled motorized vehicle 1, a handle bar 12, an engine 13, and the like.

The two-wheeled motorized vehicle 1 includes front forks 21 each on the right and left sides of the front wheel 2, and the front fork 21 is an example of a suspension apparatus that connects the front wheel 2 to the vehicle main body 10. The two-wheeled motorized vehicle 1 includes rear suspensions 22 each on the right and left sides of the rear wheel 3, and the rear suspension 22 connects the rear wheel 3 to the vehicle main body 10. FIG. 1 illustrates only the front fork 21 and the rear suspension 22 which are disposed on the right side.

The two-wheeled motorized vehicle 1 includes two brackets 14 and a shaft 15. The brackets 14 hold the front fork 21 disposed on the right side of the front wheel 2 and the front fork 21 disposed on the left side of the front wheel 2, and the shaft 15 is disposed between the two brackets 14. The shaft 15 is rotatably supported by the vehicle body frame 11.

The two-wheeled motorized vehicle 1 includes a control device 20 that controls the vehicle height of the two-wheeled motorized vehicle 1 by controlling a solenoid 310 of a flow path switching unit 300 (to be described later) of the front fork 21.

Hereinafter, the front fork 21 will be described in detail.

Figure 2:
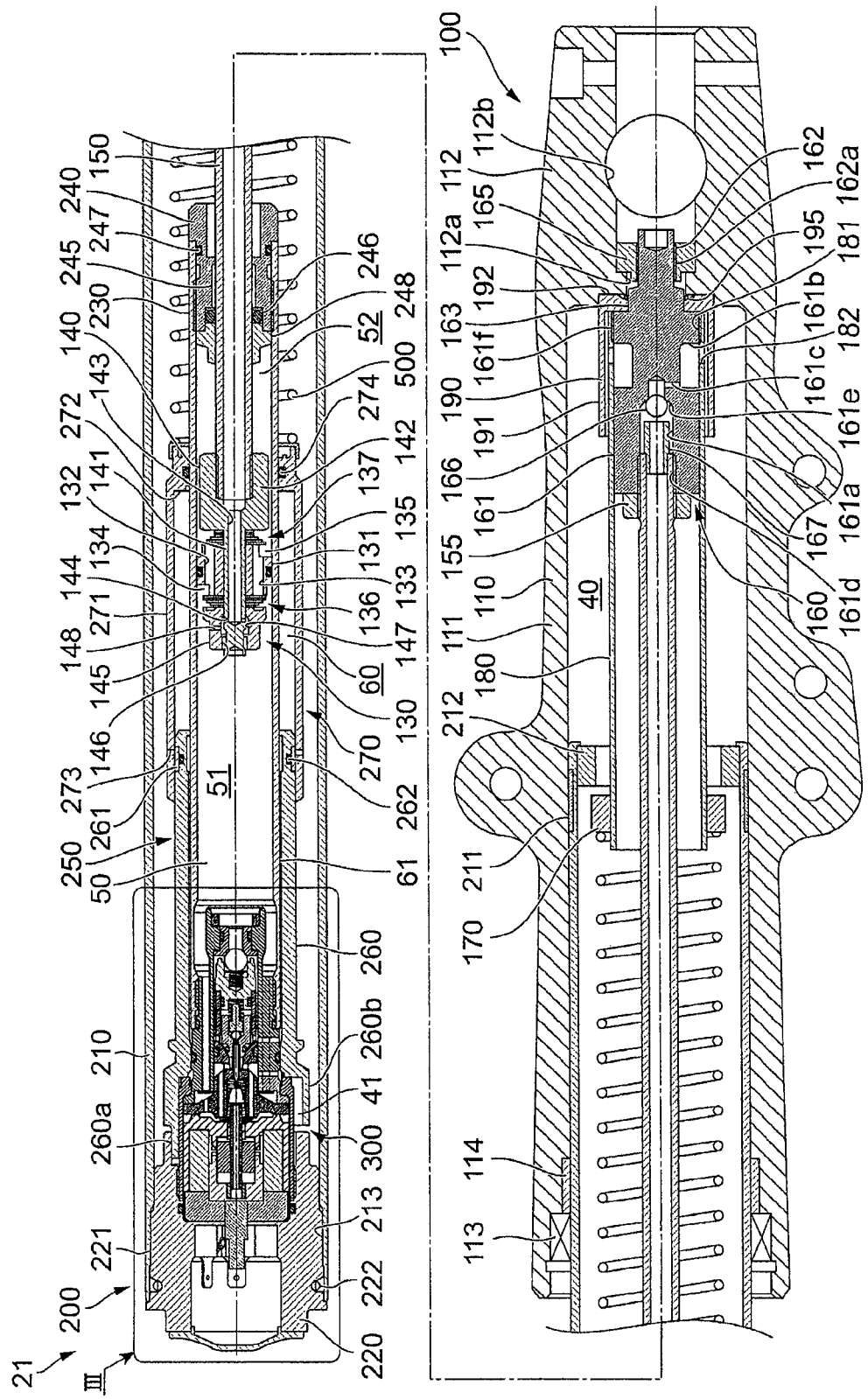
FIG. 2 is a sectional view of a front fork according to the embodiment.

FIG. 2 is a sectional view of the front fork 21 according to the embodiment of the invention.

The front fork 21 according to the embodiment is a so-called upright front fork that is disposed between the vehicle main body 10 and the front wheel 2 of the two-wheeled motorized vehicle 1, and supports the front wheel 2, and in which an outer member 110 (to be described later) is disposed close to the front wheel 2, and an inner tube 210 is disposed close to the vehicle main body 10.

The front fork 21 includes an axle side unit 100 and a main body side unit 200. The axle side unit 100 includes the outer member 110, and is attached to the axle of the front wheel 2, and the main body side unit 200 includes the inner tube 210, and is attached to the vehicle main body 10. The front fork 21 includes a spring 500 which is disposed between the axle side unit 100 and the main body side unit 200 such that the spring 500 absorbs vibration which is applied to the front wheel 2 due to roughness of a road surface.

The outer member 110 and the inner tube 210 are circular cylinder-shaped members which are coaxially disposed, and hereinafter, a direction (axial direction) of a center line of this circular cylinder may be referred to as a "vertical direction". In the embodiment, an "upper" side represents a region in which the vehicle main body 10 is disposed, and a "lower" side represents a region in which the front wheel 2 is disposed. The axle side unit 100 and the main body side unit 200 move relative to each other in the vertical direction (axial direction) such that the front fork 21 absorbs and reduces vibration induced by roughness of a road surface while supporting the front wheel 2.

Configuration of Axle Side Unit 100

The axle side unit 100 includes the outer member 110 that is attached to the axle of the front wheel 2; a damping force generation unit 130 that generates a damping force using the viscous resistance of the oil; a rod 150 that holds the damping force generation unit 130; and a rod holding member 160 that holds a lower end portion of the rod 150.

The axle side unit 100 includes a spherical ball 166 that is inserted into an axial concave portion 161a (to be described later) of the rod holding member 160, and a restricting member 167 that restricts a movement of the ball 166.

The axle side unit 100 includes a spring support member 170 that supports a lower end portion of the spring 500; a support-member holding member 180 that holds the spring support member 170; and a guide member 190 that guides an axial movement of the inner tube 210.

Configuration of Outer Member 110

The outer member 110 includes a circular cylinder-shaped portion 111 into which the inner tube 210 is inserted, and an axle bracket portion 112 to which the axle of the front wheel 2 can be attached.

The circular cylinder-shaped portion 111 includes an oil seal 113 and a slide bush 114 in an upper end portion thereof. The oil seal 113 seals a gap between the outer circumferential surface of the inner tube 210 and the circular cylinder-shaped portion 111, and the slide bush 114 helps the circular cylinder-shaped portion to smoothly slide against the outer circumferential surface of the inner tube 210.

An axial through hole 112a and an axle attachment hole 112b are formed in the axle bracket portion 112. The rod support member 160 is inserted into the axial through hole 112a, and the axle of the front wheel 2 can pass through and be attached to the axle attachment hole 112b.

Configuration of Damping Force Generation Unit 130

The damping force generation unit 130 includes a piston 131 that partitions off a working oil chamber 50 which is formed in the internal space of a cylinder 230 (to be described later); an upper end valve 136 that is provided at an upper end of the piston 131; and a lower end valve 137 that is provided at a lower end of the piston 131. The damping force generation unit 130 includes a piston bolt 140 that supports the piston 131, the upper end valve 136, the lower end valve 137, and the like, and a nut 145 that positions the piston 131, the upper end valve 136, the lower end valve 137, and the like by being tightened to the piston bolt 140.

The piston 131 is a circular cylinder-shaped member, and a seal member for sealing the gap between the cylinder 230 and the piston 131 is provided on the outer circumferential surface of the piston 131. The piston 131 is provided with a first through hole 132 and a second through hole 133 which are axial through holes. The piston 131 is provided with a first radial communication path 134 and a second radial communication path 135. The first radial communication path 134 is formed in an upper end portion of the piston 131 in such a way as to extend in a radial direction, and communicates with the first through hole 132. The second radial communication path 135 is formed in a lower end portion of the piston 131 in such a way as to extend in the radial direction, and communicates with the second through hole 133. A plurality of (for example, three) the first through holes 132 and a plurality of (for example, three) the second through holes 133 are equally spaced in a circumferential direction, and the first radial communication path 134 and the second radial communication path 135 are positioned so as to correspond to the first through hole 132 and the second through hole 133, respectively.

The upper end valve 136 is formed by overlapping a plurality of disk-like metal plates on top of each other. A through hole is formed at the center of each of the metal plates of the upper end valve 136, and a shaft portion 141 (to be described later) of the piston bolt 140 passes through the through holes. The upper end valve 136 blocks the second through hole 133, and opens the first through hole 132.

The lower end valve 137 is formed by overlapping a plurality of disk-like metal plates on top of each other. A through hole is formed at the center of each of the metal plates of the lower end valve 137, and the shaft portion 141 (to be described later) of the piston bolt 140 passes through the through holes. The lower end valve 137 blocks the first through hole 132, and opens the second through hole 133.

The piston bolt 140 includes a circular column-shaped shaft portion 141 that is provided at an upper end of the piston bolt 140, and a circular column-shaped base portion 142 that is provided at a lower end of the piston bolt 140, and has a radius which is greater than the radius of the shaft portion 141. The piston bolt 140 is provided with a concave portion 143 that is concave from a lower end surface of the base portion 142 toward the shaft portion 141.

An upper end portion of the shaft portion 141 is provided with a male screw that is tightened to a female screw formed on the nut 145.

The inner circumferential surface of a lower end portion of the concave portion 143 is provided with a female screw that is tightened to a male screw formed on an upper end portion of the rod 150. A radial through hole 144 is radially formed in an upper end portion of the concave portion 143 so that the outside of the shaft portion 141 can communicate with the concave portion 143.

An upper end portion of the nut 145 is provided with a female screw 146 to which a male screw of the piston bolt 140 is tightened, and a circular column-shaped concave portion 147 is concave from a lower end surface of the nut 145, is disposed below the female screw 146, and has a radius which is greater than the minor radius of the female screw 146. A radial through hole 148 is radially formed in the nut 145 so that the outside of the nut 145 can communicate with the concave portion 147.

The male screw formed on the upper end portion of the rod 150 is tightened to the female screw formed on the concave portion 143 of the piston bolt 140 such that the damping force generation unit 130 with the aforementioned configuration is held by the rod 150. The piston 131 is in contact with the inner circumferential surface of the cylinder 230 via the seal member that is provided on the outer circumferential surface of the piston 131, and the piston 131 partitions off the internal space of the cylinder 230 into a first oil chamber 51 (which is disposed above the piston 131) and a second oil chamber 52 (which is disposed below the piston).

Configuration of Rod 150

The rod 150 is a circular cylinder-shaped member, and male screws are respectively formed on the outer circumferential surfaces of the upper end portion and the lower end portions of the rod 150. The male screw formed on the upper end portion is screwed to the piston bolt 140 of the damping force generation unit 130, and the male screw formed on the lower end portion is tightened to a female screw 161d that is formed on an upper-end circular column-shaped portion 161 of the rod holding member 160. A lock nut 155 is tightened to the male screw that is formed on the lower end portion such that the rod 150 is fixed to the rod holding member 160.

A female screw is formed on the inner circumferential surface of the lower end portion of the rod 150.

Configuration of Rod Holding Member 160

The rod holding member 160 includes a plurality of circular column-shaped portions which have different diameters, and specifically, the rod holding member 160 includes the upper-end circular column-shaped portion 161 that is an upper end portion; a lower-end circular column-shaped portion 162 that is a lower end portion; and an intermediate circular column-shaped portion 163 that is disposed between the upper-end circular column-shaped portion 161 and the lower-end circular column-shaped portion 162.

The upper-end circular column-shaped portion 161 is provided with the axial concave portion 161a that is axially concave from the upper end surface of the upper-end circular column-shaped portion 161; a radial concave portion 161b that is radially concave from the outer circumferential surface of the upper-end circular column-shaped portion 161 over the entire circumference; and a radial through hole 161c is radially formed such that the axial concave portion 161a communicates with the radial concave portion 161b therethrough.

The axial concave portion 161a is provided with the female screw 161d that is tightened to the male screw formed on the lower end portion of the rod 150. The axial concave portion 161a is provided with an inclined surface 161e which is inclined relative to the axial direction such that the inner diameter of the axial concave portion 161a decreases gradually toward the lower side.

A lower end portion of the upper-end circular column-shaped portion 161 is provided with a male screw 161f that is tightened to a female screw 181 (to be described later) which is formed on the support-member holding member 180.

The intermediate circular column-shaped portion 163 has a diameter that is smaller than the inner diameter of an axial through hole 112a which is formed in the outer member 110, and the intermediate circular column-shaped portion 163 is fitted into the axial through hole 112a of the outer member 110.

A male screw 162a is formed on the outer circumferential surface of the lower-end circular column-shaped portion 162.

The male screw 162a formed on the lower-end circular column-shaped portion 162 is tightened to a nut 165 which is inserted into the axial through hole 112a of the outer member 110, and thus the rod holding member 160 is fixed to the outer member 110.

Configuration of Restricting Member 167

The restricting member 167 is a stepped member which is formed in the shape of a circular cylinder. A male screw is formed on the outer circumferential surface of an upper end portion of the restricting member 167. A female screw formed on the inner circumferential surface of the lower end portion of the rod 150 is tightened to this male screw such that the restricting member 167 is fixed to the rod 150. A lower end portion of the restricting member 167 restricts a movement of the ball 166 that is inserted into the axial concave portion 161a of the rod holding member 160.

Configuration of Spring Support Member 170

The spring support member 170 is a circular cylinder-shaped member, and is fixed to an upper end portion of the support-member holding member 180.
Welding or press-fit can be used as a fixing method.

Configuration of Support-Member Holding Member 180

The support-member holding member 180 is a circular cylinder-shaped member, and the lower end portion of the support-member holding member 180 is provided with the female screw 181 that is tightened to the male screw 161f which is formed on the rod holding member 160. The male screw 161f formed on the rod holding member 160 is tightened to the female screw 181 such that the support-member holding member 180 is fixed to the rod holding member 160.

A communication hole 182 is formed in the support-member holding member 180 such that the inside and the outside of the support-member holding member 180 communicate with each other, and the communication hole 182 is disposed at an axial position which correspond to the position of the radial concave portion 161b of the rod holding member 160.

Configuration of Guide Member 190

The guide member 190 includes a circular cylinder-shaped portion 191, and an inward portion 192 that radially extends inward from a lower end portion of the circular cylinder-shaped portion 191.

The inward portion 192 is interposed between the rod holding member 160 and the outer member 110 such that the guide member 190 is fixed between the rod holding member 160 and the outer member 110.

A chamfer is formed in a lower end portion of the inward portion 192, and an O-ring 195 is fitted into a space which is formed between the chamfer and the rod holding member 160. The O-ring 195 seals the gap between the guide member 190, the rod holding member 160, and the outer member 110. Accordingly, the inner space of the circular cylinder-shaped portion 111 of the outer member 110 is liquid-tightly sealed.

In the axle side unit 100 with the aforementioned configuration, a reservoir chamber 40 is formed between the inner circumferential surface of the outer member 110 and the outer circumferential surfaces of the rod 150 and the support-member holding member 180, and stores oil that is sealed in the front fork 21.

Configuration of Main Body Side Unit 200

The main body side unit 200 includes the circular cylinder-shaped inner tube 210, both ends of which are opened, and a cap 220 that is attached to an upper end portion of the inner tube 210.

The main body side unit 200 includes the circular cylinder-shaped cylinder 230, and a seal member 240 that is attached to a lower end portion of the cylinder 230, and seals the inner space of the cylinder 230.

The main body side unit 200 includes a spring-length changing unit 250 and the flow path switching unit 300. The spring-length changing unit 250 supports an upper end portion of the spring 500, and changes the length of the spring 500, and the flow path switching unit 300 is attached to an upper end portion of the cylinder 230, and switches a flow path of oil as an example of liquid.

Configuration of Inner Tube 210

The inner tube 210 is a circular cylinder-shaped member.

The inner tube 210 includes a circular cylinder-shaped slide bush 211, and a circular cylinder-shaped movement restricting member 212 in a lower end portion of the inner tube 210. The slide bush 211 helps the inner tube 210 to smoothly slide against the inner circumferential surface of the circular cylinder-shaped portion 111 of the outer member 110, and the movement restricting member 212 comes into contact with the spring support member 170 or the axle bracket portion 112 of the outer member 110 such that the movement restricting member 212 restricts an axial movement of the inner tube 210.

The upper end portion of the inner tube 210 is provided with a female screw 213 which is tightened to a male screw (to be described later) that is formed on the cap 220.

Configuration of Cap 220

The cap 220 is a substantially circular cylinder-shaped member. The outer circumferential surface of the cap 220 is provided with a male screw 221 that is tightened to the female screw 213 which is formed on the inner tube 210, and the inner circumferential surface of the cap 220 is provided with female screws which are tightened to male screws that are formed on the spring-length changing unit 250 and the flow path switching unit 300. The cap 220 is attached to the inner tube 210, and holds the spring-length changing unit 250 and the flow path switching unit 300.

The cap 220 includes an O-ring 222 that liquid-tightly seals the inner space of the inner tube 210.

Configuration of Cylinder 230

The cylinder 230 is a circular cylinder-shaped member. The outer circumferential surface of the upper end portion of the cylinder 230 is provided with a female screw that is tightened to a male screw formed on the flow path switching unit 300. The inner circumferential surface of the lower end portion of the cylinder 230 is provided with a female screw that is tightened to a male screw which is formed on the seal member 240.

Configuration of Seal Member 240

The seal member 240 is a circular cylinder-shaped member. The outer circumferential surface of the seal member 240 is provided with a male screw that is tightened to the female screw formed on the inner circumferential surface of the lower end portion of the cylinder 230. The female screw formed on the inner circumferential surface of the lower end portion of the cylinder 230 is tightened to this male screw such that the seal member 240 is held by the cylinder 230.

The seal member 240 includes a slide bush 245 on the inner circumference, and the slide bush 245 helps the outer circumferential surface of the rod 150 to smoothly slide against the seal member 240. The seal member 240 includes an O-ring 246 that is disposed between the seal member 240 and the outer circumferential surface of the rod 150, and an O-ring 247 that is disposed between the seal member 240 and the inner circumferential surface of the cylinder 230, and as a result, the inner space of the cylinder 230 is liquid-tightly sealed.

A shock absorbing member 248 is attached to an upper end portion of the seal member 240, and absorbs shock that is applied when the damping force generation unit 130 comes into contact with the shock absorbing member 248. The shock absorbing member 248 can be formed as an elastic member made of resin or rubber.

Configuration of Spring-Length Chaining Unit 250

The spring-length changing unit 250 includes a base member 260 and an upper end-portion support member 270. The base member 260 is fixed to the cap 220, and the upper end-portion support member 270 supports the upper end portion of the spring 500, and changes the length of the spring 500 by moving relative to the base member 260 in the axial direction.

The base member 260 is a substantially circular cylinder-shaped member. The outer circumferential surface of an upper end portion of the base member 260 is provided with a male screw 260a that is tightened to a female screw formed on the cap 220. The female screw formed on the cap 220 is tightened to the male screw 260a such that the base member 260 is fixed to the cap 220.

A circumferential portion of the upper end portion of the base member 260 protrudes in the radial direction such that a protruding portion 260b is formed. A discharge flow path 41 for discharging oil in the cylinder 230 to the reservoir chamber 40 is formed between the inner surface of the protruding portion 260b and the outer circumferential surface of a lower end portion of a support member 400 (to be described later).

The base member 260 includes a circular cylinder-shaped slide bush 261 and an O-ring 262 in a lower end portion of the base member 260. The slide bush 261 is fitted to the outer circumference of the base member 260, and helps the base member 260 to smoothly slide against the inner circumferential surface of the upper end-portion support member 270, and the O-ring 262 is provided inside the slide bush 261. An annular flow path 61 is formed between the inner circumferential surface of the base member 260 and the outer circumferential surface of the cylinder 230.

The upper end-portion support member 270 includes a circular cylinder-shaped portion 271, and an inward portion 272 that radially extends inward from a lower end portion of the circular cylinder-shaped portion 271. The upper end-portion member 270 forms a jack chamber 60 that is a space between the outer circumferential surface of the cylinder 230 and the lower end portion of the base member 260, and the jack chamber 60 accommodates oil used to change the position of the upper end-portion support member 270 relative to the base member 260.

The inner diameter of the circular cylinder-shaped portion 271 is set to be smaller than the outer diameter of the slide bush 261 that is fitted to the base member 260. A radial through hole 273 is radially formed in the circular cylinder-shaped portion 271 so that the inside and the outside of the circular cylinder-shaped portion 271 communicate with each other. Oil is discharged from the jack chamber 60 to the reservoir chamber 40 via the radial through hole 273 such that the amount of movement of the upper end-portion support member 270 relative to the base member 260 is restricted.

An O-ring 274 is provided on the inner circumference of the inward portion 272, and liquid-tightly seals the jack chamber 60 by sealing the gap between the inward portion 272 and the outer circumferential surface of the cylinder 230.

Oil in the cylinder 230 is supplied to the jack chamber 60 via the annular flow path 61 that is formed between the inner circumferential surface of the base member 260 and the outer circumferential surface of the cylinder 230. A detailed description will be given later.

Configuration of Flow Path Switching Unit 300

Figure 3:
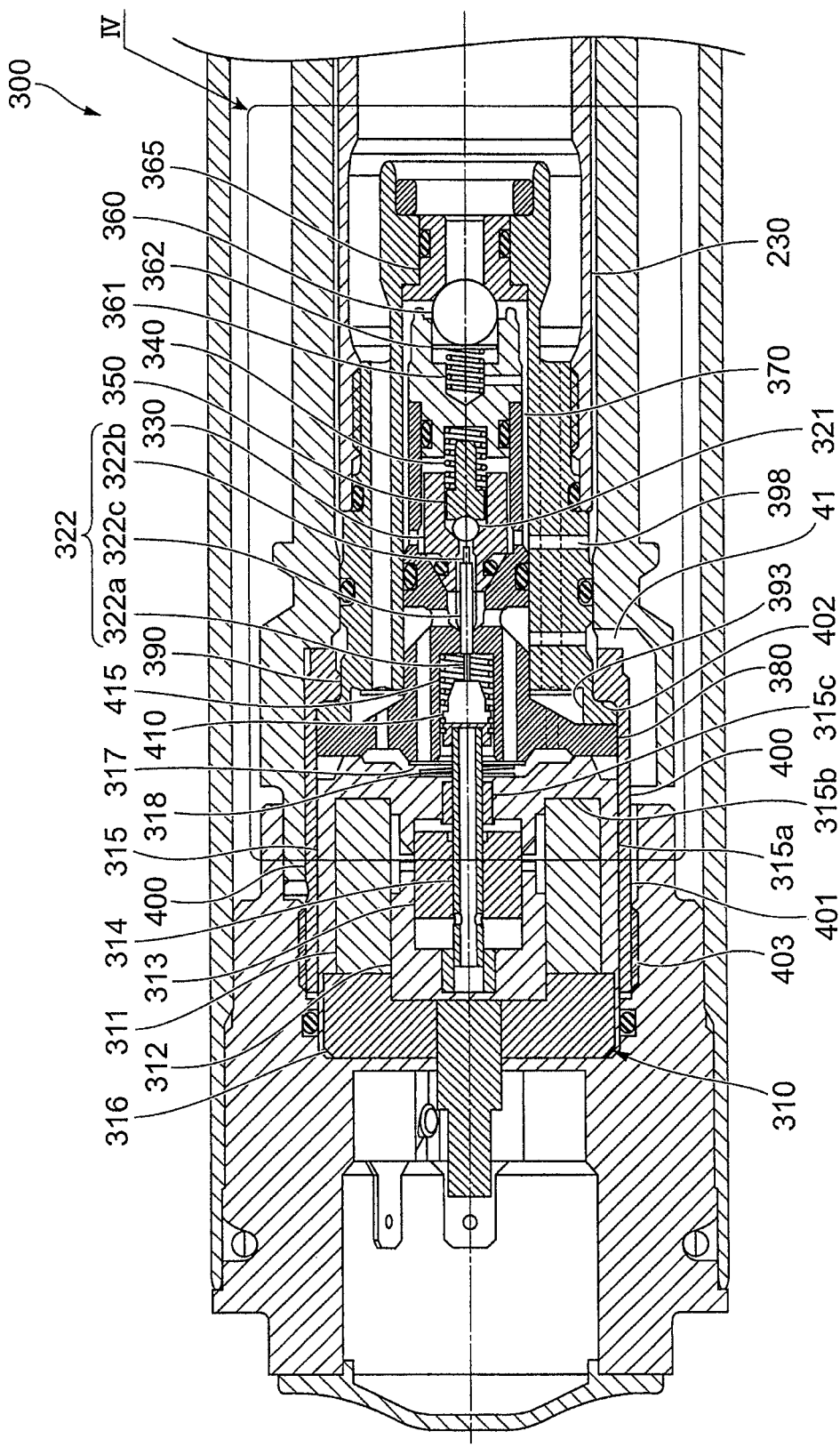
FIG. 3 is an enlarged view of portion III in FIG. 2.

FIG. 3 is an enlarged view of portion III in FIG. 2.

Figure 4:
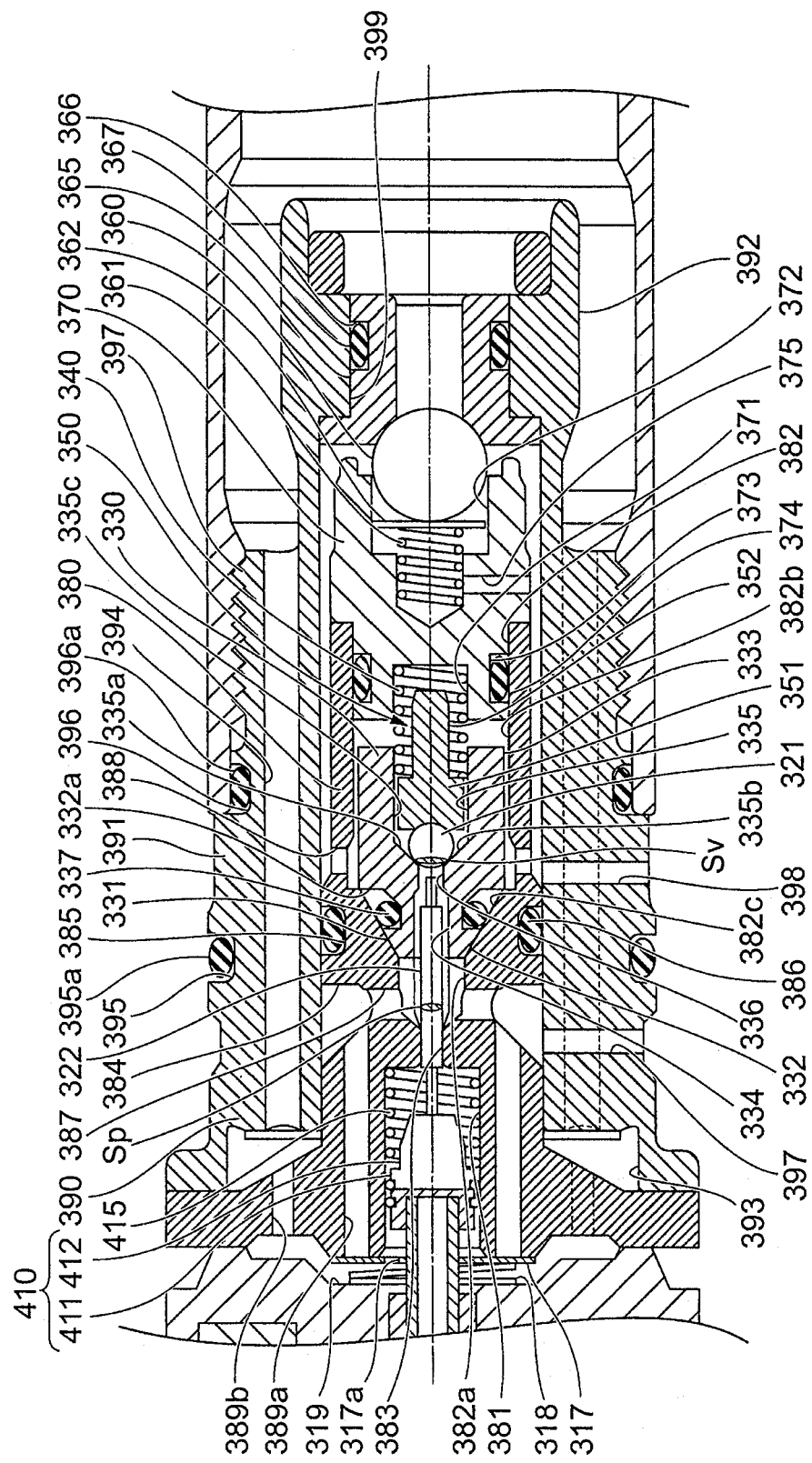
FIG. 4 is an enlarged view of portion IV in FIG. 3.

FIG. 4 is an enlarged view of portion IV in FIG. 3.

The flow path switching unit 300 is an device which switches a flow path of oil such that oil discharged by a pump 600 (to be described later) is supplied to the reservoir chamber 40, oil discharged by the pump 600 is supplied to the jack chamber 60, or oil in the jack chamber 60 is supplied to the reservoir chamber 40.

The flow path switching unit 300 includes the solenoid 310; a spherical valve body 321; a bar-shaped push rod 322 that pushes the valve body 321; a valve-body seat member 330 that has a resting surface for the valve body 321; a coil spring 340; and a push member 350 that pushes the valve body 321 against the resting surface due to a spring force of the coil spring 340 applied thereto.

The flow path switching unit 300 includes a spherical ball 360; a coil spring 361 that applies a biasing force to the ball 360 in the axial direction; and a disk 362 that is interposed between the ball 360 and the coil spring 361. The flow path switching unit 300 includes a ball seat member 365 that has a resting surface for the ball 360, and an accommodation member 370 that accommodates the coil spring 361 and the disk 362.

The flow path switching unit 300 includes an inner valve accommodation member 380 that accommodates the valve body 321, the valve body seat member 330, and the like; an outer valve accommodation member 390 that is disposed outside of the inner valve accommodation member 380, and accommodates the ball 360, the ball seat member 365, and the like; and a support member 400 that supports the inner valve accommodation member 380 and the outer valve accommodation member 390.

The flow path switching unit 300 includes a transmission member 410 and a coil spring 415. The transmission member 410 is mounted in a lower end portion of an operation rod 314 (to be described later) of the solenoid 310, and transmits a thrust force of the solenoid 310 to the push rod 322, and the coil spring 415 applies a biasing force to the transmission member 410 in the axial direction.

Configuration of Solenoid 310

The solenoid 310 is a proportional solenoid that includes a coil 311; a core 312 that is disposed inside of the coil 311;

a plunger 313 that is guided by the core 312; and the operation rod 314 that is connected to the plunger 313.

The solenoid 310 includes a case 315 that accommodates the coil 311, the core 312, the plunger 313, and the like, and a cover 316 that covers an opening portion of the case 315.

The case 315 includes a circular cylinder-shaped portion 315a, and an inward portion 315b that radially extends inward from a lower end portion of the circular cylinder-shaped portion 315a. The inward portion 315b is provided with a through hole via which the operation rod 314 passes, and a guide bush 315c is fitted into the inward portion 315b such that the guide bush 315c guides a movement of the operation rod 314.

The operation rod 314 is hollow, an upper end portion of the operation rod 314 is accommodated in the case 315, and a lower end portion of the operation rod 314 protrudes from the case 315. A disk-like valve 317 is attached to a portion of the operation rod 314 which protrudes from the case 315, and opens and closes a flow path (to be described later) that is formed in the inner valve accommodation member 380. A coil spring 318 is attached to the circumference of the operation rod 314 while being disposed between the valve 317 and the case 315, and applies a biasing force to the valve 317 in the axial direction.

The coil 311 is energized via a connector and lead wires which are mounted in the cap 220 such that the solenoid 310 with the aforementioned configuration generates an axial thrust force of the plunger 313 in response to energization current. The operation rod 314 connected to the plunger 313 moves in the axial direction due to the thrust force of the plunger 313. The solenoid 310 of the embodiment generates an axial thrust force of the plunger 313 in such a way that the operation rod 314 protrudes from the case 315 to the extent that the energization current to the coil 311 increases.

The amount of energization to the coil 311 is controlled by the control device 20.

Configuration of Push Rod 322

The push rod 322 includes a circular column-shaped first shaft portion 322a that is positioned in an upper end portion of the push rod 322; a circular column-shaped second shaft portion 322b that is positioned in a lower end portion of the push rod 322; and a circular column-shaped third shaft portion 322c that is positioned between the first shaft portion 322a and the second shaft portion 322b.

The radius of the third shaft portion 322c is greater than the radius of each of the first shaft portion 322a and the second shaft portion 322b. That is, a sectional area Sp of the third shaft portion 322c is greater than a sectional area of the first shaft portion 322a and a sectional area of the second shaft portion 322b, and here, the sectional areas are perpendicular to the axial direction.

The valve body 321 may be integrated with the push rod 322.

Configuration of Valve Body Seat Member 330

The valve body seat member 330 includes a conical portion 332 and a circular column-shaped portion 333, and the conical portion 332 has an inclined surface 331 which is inclined relative to the axial direction such that the outer diameter of the conical portion 332 increases gradually toward the lower side.

An upper end concave portion 334 is formed in the conical portion 332, and is concave from the upper end surface of the conical portion 332. A lower end concave portion 335 and a communication hole 336 are formed in the circular column-shaped portion 333. The lower end concave portion 335 is concave from the lower end surface of the circular column-shaped portion 333, and the lower end concave portion 335 communicates with the upper end concave portion 334 via the communication hole 336.

The inner diameter of the upper end concave portion 334 is greater than the radius of the third shaft portion 322c, and the inner diameter of the communication hole 336 is greater than the radius of the second shaft portion 322b. The second shaft portion 322b and the third shaft portion 322c of the push rod 322 are inserted into the upper end concave portion 334 and the communication hole 336. The gap between the outer circumferential surface of the second shaft portion 322b and the inner circumferential surface of the communication hole 336, and the gap between the outer circumferential surface of the third shaft portion 322c and the inner circumferential surface of the upper end concave portion 334 work as parts of a third communication path R3 and a fourth communication path.

The lower end concave portion 335 includes a conical concave portion 335b and a circular column-shaped portion 335c, and the conical concave portion 335b has an inclined surface 335a which is inclined relative to the axial direction such that the radius of the conical concave portion 335b increases gradually toward the lower side. The radius of the conical concave portion 335b changes from a value, which is smaller than the radius of the valve body 321, to a value, which is greater than the radius of the valve body 321, toward the lower side. The conical concave portion 335b accommodates the valve body 321, and the valve body 321 comes into contact with the inclined surface 335a such that the gap between the valve body 321 and the conical concave portion 335b is sealed. The radius of the circular column-shaped concave portion 335c of the lower end concave portion 335 is greater than the radius of a first circular column-shaped portion 351 (to be described later) of the push member 350. The lower end concave portion 335 accommodates the first circular column-shaped portion 351 of the push member 350.

A groove 332a is formed in the outer circumferential surface of the conical portion 332 over the entire circumference. An O-ring 337 is fitted into the groove 332a, and seals the gap between the inner valve accommodation member 380 and the conical portion 332.

Configuration of Push Member 350

The push member 350 includes two portions, that is, the first circular column-shaped portion 351 and a second circular column-shaped portion 352 which have different diameters.

A concave portion adapted to the shape of a lower end portion of the valve body 321 is formed in the upper end surface of the first circular column-shaped portion 351. The radius of the first circular column-shaped portion 351 is greater than the radius of the valve body 321, and half the mean diameter of the coil spring 340. The upper end surface of the first circular column-shaped portion 351 supports the lower end portion of the valve body 321, and the lower end surface of the first circular column-shaped portion 351 supports an upper end portion of the coil spring 340.

The radius of the second circular column-shaped portion 352 is smaller than half the inner diameter of the coil spring 340, and the second circular column-shaped portion 352 is inserted into the coil spring 340.

Configuration of Ball Seat Member 365

The ball seat member 365 is a circular cylinder-shaped member that has a flange in an upper end portion of the ball seat member 365. A concave portion adapted to the shape of a lower end portion of the ball 360 is formed at an upper end opening of the ball seat member 365. A groove 366 is formed in the outer circumferential surface of the ball seat member 365 over the entire circumference, and an O-ring 367 is fitted into the groove 366 such that the gap between the ball seat member 365 and the outer valve accommodation member 390 is sealed.

Configuration of Accommodation Member 370

The accommodation member 370 is a substantially circular column-shaped member. An upper end concave portion 371 with the shape of a circular column and a lower end concave portion 372 with the shape of a circular column are formed in the accommodation member 370. The upper end concave portion 371 is concave from the upper end surface of the accommodation member 370, and the lower end concave portion 372 is concave from the lower end surface of the accommodation member 370. The upper end concave portion 371 accommodates a lower end portion of the coil spring 340, and the lower end concave portion 372 accommodates the coil spring 361 and the disk 362. The size of an opening portion of the lower end concave portion 372 is greater than that of an upper end portion of the ball 360, and the lower end concave portion 372 accommodates the upper end portion of the ball 360.

The accommodation member 370 is fitted into a lower end portion of the inner valve accommodation member 380. A groove 373 is formed in the outer circumferential surface of the accommodation member 370 over the entire circumference, and an O-ring 374 is fitted into the groove 373 such that the gap between the accommodation member 370 and the inner valve accommodation member 380 is sealed.

A radial through hole 375 is radially formed in a portion of the accommodation member 370 which is exposed from the inner valve accommodation member 380, and the inside of the lower end concave portion 372 communicates with the outside of the accommodation member 370 via the radial through hole 375.

Configuration of Inner Valve Accommodation Member 380

The inner valve accommodation member 380 is a substantially circular column-shaped member that has a flange in an upper end portion of the inner valve accommodation member 380. An upper end concave portion 381, a lower end concave portion 382, and a communication hole 383 are formed in the inner valve accommodation member 380. The upper end concave portion 381 is concave from the upper end surface of the inner valve accommodation member 380, the lower end concave portion 382 is concave from the lower end surface of the inner valve accommodation member 380, and the upper end concave portion 381 communicates with the lower end concave portion 382 via the communication hole 383. A first radial concave portion 384 and a second radial concave portion 385 are formed in the outer circumferential surface of the inner valve accommodation member 380, and are concave in the radial direction over the entire circumference of the inner valve accommodation member 380.

The upper end concave portion 381 is formed in the shape of a circular column, and accommodates the transmission member 410 and the coil spring 415.

The lower end concave portion 382 includes a first circular column-shaped concave portion 382a and a second circular column-shaped concave portion 382b that have different diameters, and a conical concave portion 382c that is formed between the first circular column-shaped concave portion 382a and the second circular column-shaped concave portion 382b, and has an inclined surface which is inclined relative to the axial direction such that the radius of the conical concave portion 382c increases gradually toward the lower side.

The first circular column-shaped concave portion 382a, the conical concave portion 382c, and the second circular column-shaped concave portion 382b accommodate the valve body seat member 330. That is, the inclined surface of the conical concave portion 382c is adapted to the shape of the inclined surface 331 of the conical portion 332 of the valve body seat member 330, and the radius of the second circular column-shaped concave portion 382b is smaller than the radius of the circular column-shaped portion 333 of the valve body seat member 330.

The upper end portion of the accommodation member 370 is fitted into an opening portion of the lower end concave portion 382, that is, a lower end portion of the second circular column-shaped concave portion 382b. The O-ring 374 fitted to the accommodation member 370 seals the gap between the accommodation member 370 and the inner valve accommodation member 380.

An O-ring 386 is fitted into the second radial concave portion 385, and seals the gap between the second radial concave portion 385 and the outer valve accommodation member 390.

A first radial communication hole 387 is radially formed in the inner valve accommodation member 380 such that the first circular column-shaped concave portion 382a of the lower end concave portion 382 communicates with the first radial concave portion 384 therethrough. A plurality of the first radial communication holes 387 are equally spaced in the circumferential direction.

A second radial communication hole 388 is radially formed in the inner valve accommodation member 380 such that the second circular column-shaped concave portion 382b communicates with the outside of the inner valve accommodation member 380 therethrough. A plurality of the second radial communication holes 388 are equally spaced in the circumferential direction.

An inner axial communication hole 389a is axially formed in the inner valve accommodation member 380 such that the upper end surface of the inner valve accommodation member 380 communicates with the first radial concave portion 384 therethrough. A plurality of the inner axial communication holes 389a are equally spaced in the circumferential direction.

An outer axial communication hole 389b is axially formed in the flange of the inner valve accommodation member 380. A plurality of the outer axial communication holes 389b are equally spaced in the circumferential direction.

Configuration of Outer Valve Accommodation Member 390

The outer valve accommodation member 390 includes a first circular cylinder-shaped portion 391 and a second circular cylinder-shaped portion 392 that have different diameters, and a flange portion that radially extends outward from an upper end portion of the first circular cylinder-shaped portion 391. The outer diameter of the first circular cylinder-shaped portion 391 is greater than that of the second circular cylinder-shaped portion 392.

An upper end-surface concave portion 393 is formed in the outer valve accommodation portion 390, and is concave from the upper end surface of the outer valve accommodation member 390.

An axial communication hole 394 is axially formed in the first circular cylinder-shaped portion 391, and the upper end-surface concave portion 393 communicates with a space via the axial communication hole 394, with the space being formed below the first circular cylinder-shaped portion 391, and between the outer circumferential surface of the second circular cylinder-shaped portion 392 and the inner circumferential surface of the cylinder 230. A plurality of the axial communication holes 394 are equally spaced in the circumferential direction.

A first radial concave portion 395, a second radial concave portion 396, and a male screw 397 are formed on the outer circumferential surface of the first circular cylinder-shaped portion 391. The first radial concave portion 395 and the second radial concave portion 396 are concave in the radial direction over the entire circumference of the first circular cylinder-shaped portion 391, and the male screw 397 is tightened to a female screw that is formed on an upper end portion of the cylinder 230.

An O-ring 395a is fitted into the first radial concave portion 395, and seals the gap between first circular cylinder-shaped portion 391 and the base member 260 of the spring-length changing unit 250.

An O-ring 396a is fitted into the second radial concave portion 396, and seals the gap between first circular cylinder-shaped portion 391 and the cylinder 230.

A first radial communication hole 397 and a second radial communication hole 398 are radially formed in the first circular cylinder-shaped portion 391 such that the inside and the outside of the outer valve accommodation member 390 communicate with each other therethrough. A plurality of the first radial communication holes 397, and a plurality of the second radial communication holes 398 are formed in portions of the first circular cylinder-shaped portion 391 in which the axial communication holes 394 are not formed, while being equally spaced in the circumferential direction. The first radial communication hole 397 is positioned above the first radial concave portion 395 in the axial direction, and the second radial communication hole 398 is positioned between the first radial concave portion 395 and the second radial concave portion 396.

The second circular cylinder-shaped portion 392 includes a convex portion 399 that protrudes inward from the inner circumferential surface of the second circular cylinder-shaped portion 392. The flange of the ball seat member 365 is mounted on the upper end surface of the convex portion 399, and the O-ring 367 fitted to the ball seat member 365 seals the gap between the inner circumferential surface of the convex portion 399 and the outer circumferential surface of the ball seat member 365.

The male screw 397 formed on the outer circumferential surface of the first circular cylinder-shaped portion 391 is tightened to the female screw formed on the inner circumferential surface of the cylinder 230 such that the outer valve accommodation member 390 holds the cylinder 230.

Configuration of Support Member 400

As illustrated in FIG. 3, the support member 400 includes a circular cylinder-shaped portion 401, and an inward portion 402 that radially extends inward from a lower end portion of the circular cylinder-shaped portion 401.

The outer circumferential portion of an upper end portion of the circular cylinder-shaped portion 401 is provided with a male screw 403 that is tightened to a female screw formed on the cap 220. The male screw 403 formed on the outer circumferential surface of the circular cylinder-shaped portion 401 is tightened to the female screw formed on the cap 220 such that the support member 400 is held by the cap 220. The flange portion of the inner valve accommodation member 380 and the flange portion of the outer valve accommodation member 390 are interposed between the inward portion 402 and the solenoid 310 such that the support member 400 holds the inner valve accommodation member 380 and the outer valve accommodation member 390.

Configuration of Transmission Member 410

The transmission member 410 includes a first circular column-shaped portion 411 and a second circular column-shaped portion 412 which have different diameters.

The outer diameter of the second circular column-shaped portion 412 is smaller than the inner diameter of the coil spring 415, and the second circular column-shaped portion 412 is inserted into the coil spring 415.

The outer diameter of the first circular column-shaped portion 411 is greater than the inner diameter of the coil spring 415. The outer circumferential surface of the first circular column-shaped portion 411 is provided with a groove into which an upper end portion of the coil spring 415 is fitted.

The upper end concave portion 381 of the inner valve accommodation member 380 accommodates the transmission member 410 and the coil spring 415.

A concave portion 319 is formed in the lower end surface of the solenoid 310, and accommodates a valve 317 and a coil spring 318. A through hole 317a is axially formed in the valve 317, and is positioned to face the upper end concave portion 381 of the inner valve accommodation member 380. The coil spring 318 applies a biasing force to the valve 317 toward the upper end surface of the inner valve accommodation member 380 in the axial direction.

In the flow path switching unit 300 with the aforementioned configuration, when the energization of the coil 311 of the solenoid 310 is cut off, or electric current supplied to the coil 311 is lower than or equal to a predetermined first reference electric current, the amount of protrusion of the operation rod 314 from the case 315 becomes less than a predetermined first reference amount. When the amount of protrusion of the operation rod 314 is less than the first reference amount, the valve 317 attached to the operation rod 314 does not rest on the upper end surface of the inner valve accommodation member 380, and opens an upper end opening of an inner axial communication hole 389a that is formed in the inner valve accommodation member 380.

In contrast, when electric current supplied to the coil 311 of the solenoid 310 is higher than or equal to the first reference electric current, the operation rod 314 moves downward, and the amount of protrusion of the operation rod 314 from the case 315 becomes greater than or equal to the first reference amount. When the amount of protrusion of the operation rod 314 is greater than or equal to the first reference amount, the valve 317 attached to the operation rod 314 rests on the upper end surface of the inner valve accommodation member 380, and closes the upper end opening of the inner axial communication hole 389a. In other words, when the amount of protrusion of the operation rod 314 from the case 315 is greater than or equal to the first reference amount, the operation rod 314 protrudes to a position in which the valve 317 rests on the upper end surface of the inner valve accommodation member 380.

When electric current supplied to the coil 311 of the solenoid 310 is higher than or equal to a second reference electric current predetermined to be higher than the first reference electric current, the operation rod 314 moves further downward, and the amount of protrusion of the operation rod 314 from the case 315 becomes greater than or equal to a second reference amount predetermined to be greater than the first reference amount. When the amount of protrusion of the operation rod 314 is greater than or equal to the second reference amount, the operation rod 314 pushes the push rod 322 downward via the transmission member 410. When the push rod 322 moves downward, the valve body 321 is pushed by the push rod 322 such that the valve body 321 moves away from the inclined surface 335*a* of the lower end concave portion 335 of the valve body seat member 330. In other words, when the amount of protrusion of the operation rod 314 from the case 315 is greater than or equal to the second reference amount, the push rod 322 is pushed by the operation rod 314, and pushes the valve body 321 such that the valve body 321 moves away from the inclined surface 335*a* which is an example of a resting surface.

In the following description, a first switch state refers to a state in which the valve 317 attached to the operation rod 314 opens the inner axial communication hole 389*a* of the inner valve accommodation member 380, and the valve body 321 rests on the inclined surface 335*a* of the lower end concave portion 335 of the valve body seat member 330 when the energization of the coil 311 is cut off, or electric current supplied to the coil 311 is lower than the predetermined first reference electric current.

A second switch state refers to a state in which the valve 317 attached to the operation rod 314 closes the inner axial communication hole 389*a* of the inner valve accommodation member 380, and the valve body 321 rests on the inclined surface 335*a* of the lower end concave portion 335 of the valve body seat member 330 when electric current supplied to the coil 311 is higher than or equal to the first reference electric current, and is lower than the second reference electric current.

A third switch state refers to a state in which the valve 317 attached to the operation rod 314 closes the inner axial communication hole 389*a* of the inner valve accommodation member 380, and the valve body 321 moves away from the inclined surface 335*a* of the lower end concave portion 335 of the valve body seat member 330 when electric current supplied to the coil 311 is higher than or equal to the second reference electric current, and is lower than third reference electric current.

A fourth switch state refers to a state in which the valve 317 attached to the operation rod 314 closes the inner axial communication hole 389*a* of the inner valve accommodation member 380, and the inclined surface 331 of the conical portion 332 of the valve body seat member 330 moves away from the inclined surface of the conical concave portion 382*c* of the inner valve accommodation member 380 when electric current supplied to the coil 311 is higher than or equal to the third reference electric current. In the fourth switch state, the valve body 321 rests on the inclined surface 335*a* of the lower end concave portion 335 of the valve body seat member 330.

Operation of Front Fork 21

In the front fork 21 with the aforementioned configuration, the spring 500 supports weight of the two-wheeled motorized vehicle 1 and absorbs shock, and the damping force generation unit 130 dampens vibration of the spring 500.

Figure 5:
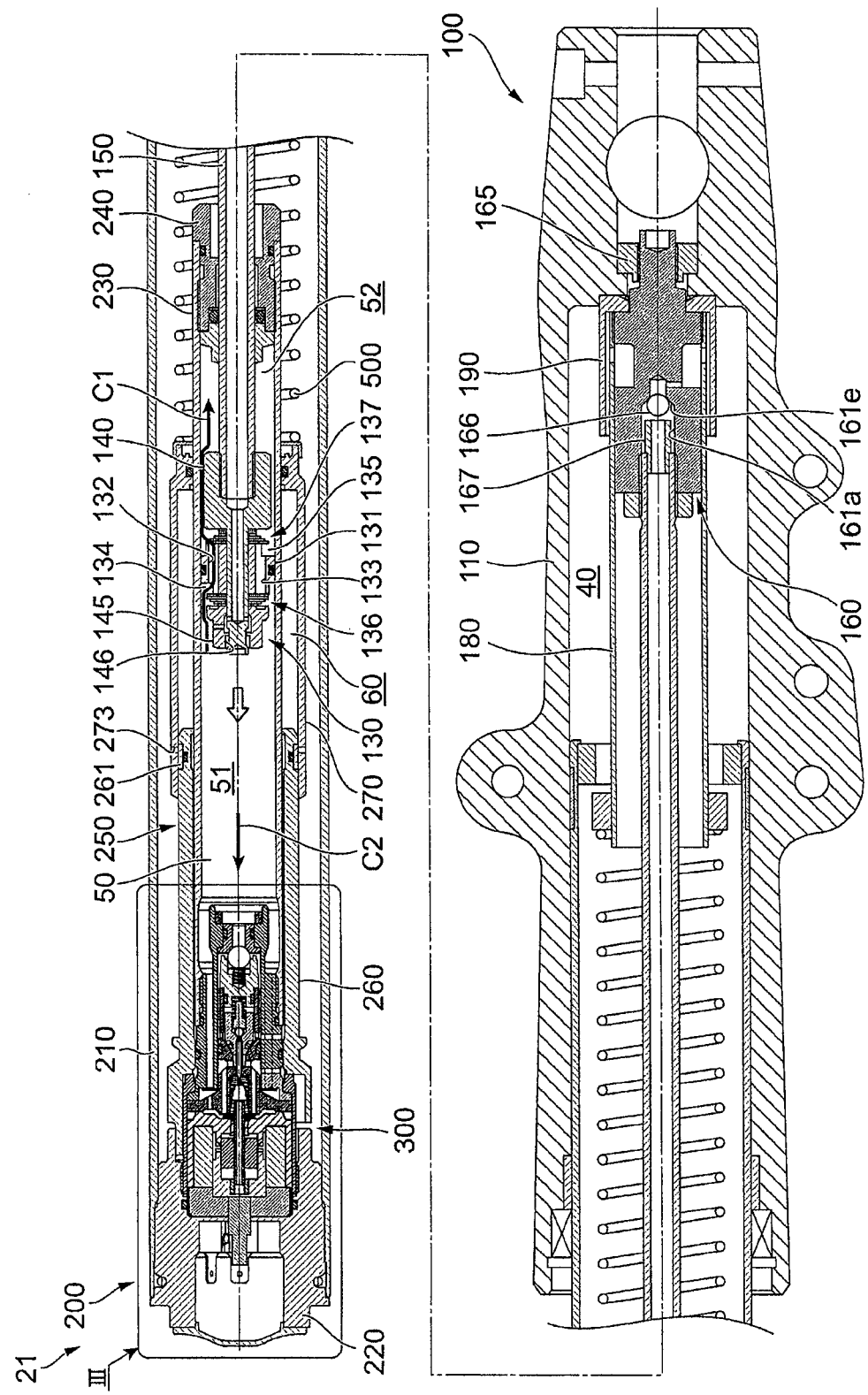
FIG. 5 is a view illustrating the operation of the front fork during a compression stroke.

FIG. 5 is a view illustrating the operation of the front fork 21 during a compression stroke.

When the front fork 21 undergoes the compression stroke, the piston 131 of the damping force generation unit 130 moves upward relative to the cylinder 230 as illustrated by the white arrow, and due to the movement of the piston 131, oil in the first oil chamber 51 is pressed, and oil pressure increases. As a result, the second through hole 133 is blocked, the lower end valve 137 is opened, and the oil flows into the second oil chamber 52 via the first through hole 132 (refer to arrow C1). The flow of the oil from the first oil chamber 51 to the second oil chamber 52 is restricted by the first through hole 132 and the lower end valve 137 such that a damping force is obtained during the compression stroke.

Since the rod 150 enters the cylinder 230 during the compression stroke, a volume of oil corresponding to the extent of the entry of the rod is supplied to the jack chamber 60 or the reservoir chamber 40 depending on a switch state of the flow path switching unit 300 (refer to arrow C2). The supply of oil to either of the jack chamber 60 and the reservoir chamber 40 depending on a switch state of the flow path switching unit 300 will be described later. The damping force generation unit 130, the rod 150, the cylinder 230, and the like work as a pump that supplies the oil in the cylinder 230 to the jack chamber 60 or the reservoir chamber 40. Hereinafter, this pump may be referred to as a "pump 600".

Figure 6:
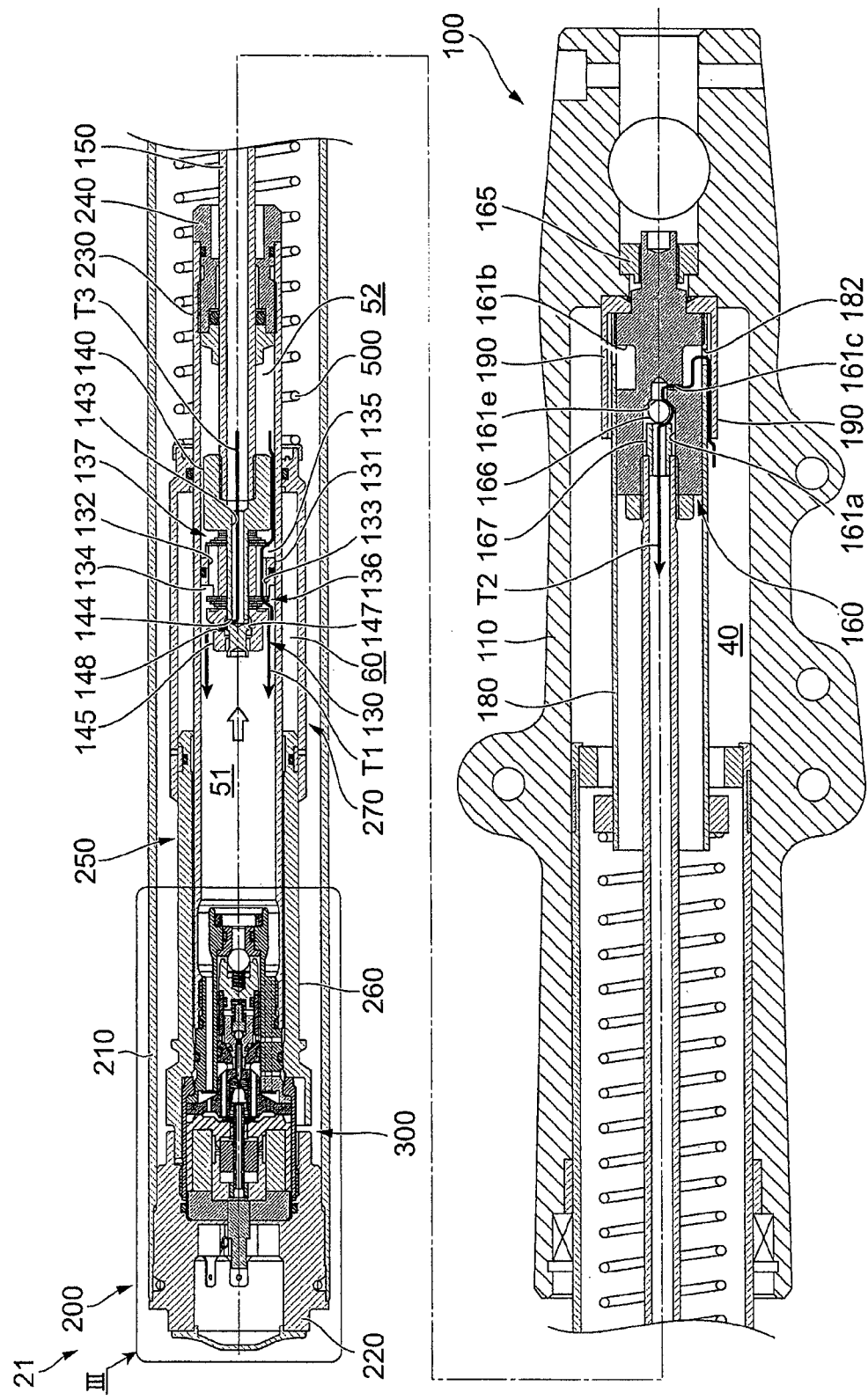
FIG. 6 is a view illustrating the operation of the front fork during an extension stroke.

FIG. 6 is a view illustrating the operation of the front fork 21 during an extension stroke.

When the front fork 21 undergoes the extension stroke, the piston 131 of the damping force generation unit 130 moves downward relative to the cylinder 230 as illustrated by the white arrow, and due to the movement of the piston 131, oil in the second oil chamber 52 is pressed, and oil pressure increases. As a result, the first through hole 132 is blocked, the upper end valve 136 is opened, and the oil flows into the first oil chamber 51 via the second through hole 133 (refer to arrow T1). The flow of the oil from the second oil chamber 52 to the first oil chamber 51 is restricted by the second through hole 133 and the upper end valve 136 such that a damping force is obtained during the extension stroke.

Since the rod 150 is pulled out of the cylinder 230 during the extension stroke, a volume of oil corresponding to the extent of the rod being pulled out is supplied from the reservoir chamber 40 to the first oil chamber 51. That is, oil in the reservoir chamber 40 enters the first oil chamber 51, the pressure of which has become low due to the downward movement of the piston 131.

That is, the oil in the reservoir chamber 40 enters the axial concave portion 161*a* of the rod holding member 160 via the communication hole 182 of the support-member holding member 180, and the radial through hole 161*c* of the rod holding member 160, moves the ball 166 upward, and then enters the inside of the rod 150 (refer to arrow T2). The oil, which has entered the inside of the rod 150, reaches the first oil chamber 51 via the concave portion 143 and the radial through hole 144 of the piston bolt 140, and the radial through hole 148 of the nut 145 (refer to arrow T3).

The following portions work as a suction path through which oil is suctioned into the cylinder 230 (the first oil chamber 51) from the reservoir chamber 40: the communication hole 182 of the support-member holding member 180; the radial through hole 161*c* of the rod holding member 160; the axial concave portion 161*a* of the rod holding member 160; the inside of the rod 150; the concave portion 143 and the radial through hole 144 of the piston bolt 140; and the radial through hole 148 of the nut 145. The ball 166, and the inclined surface 161*e* of the axial concave portion 161*a* of the rod holding member 160 work as a check valve that allows oil to flow into the rod 150 from the reservoir chamber 40, and prevents oil from being discharged from the rod 150 to the reservoir chamber 40. Hereinafter, the ball 166 and the inclined surface 161*e* are referred to as a "suction side check valve Vc".

Circulation State of Oil Depending on Switch State of Flow Path Switching Unit 300

Figure 7:
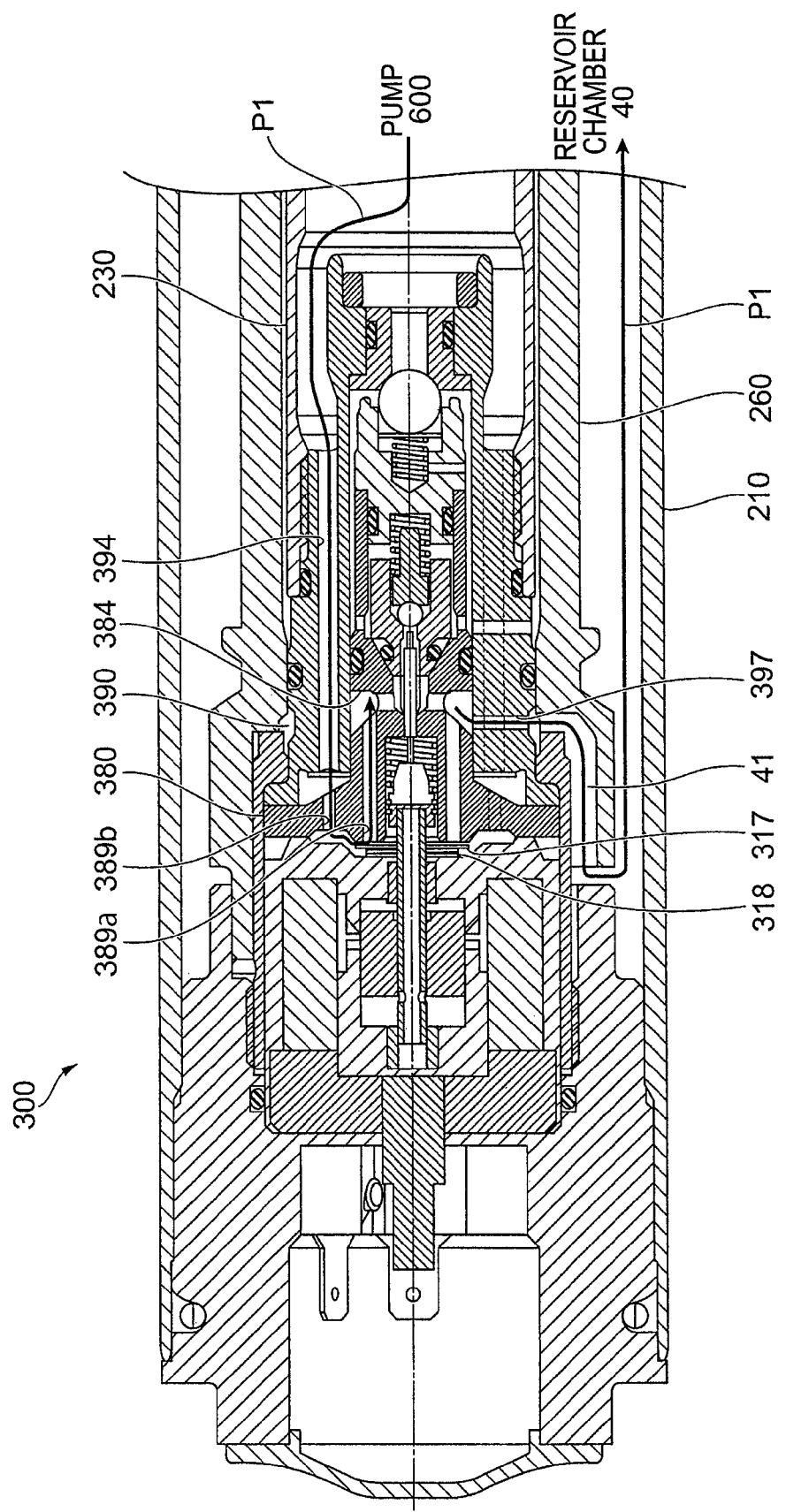
FIG. 7 is a view illustrating a circulation state of oil when a flow path switching unit is in a first switch state.

FIG. 7 is a view illustrating a circulation state of oil when the flow path switching unit 300 is in the first switch state.

When the flow path switching unit 300 is in the first switch state during the compression stroke of the front fork 21, as illustrated by arrow P1 in FIG. 7, oil discharged by the pump 600 (which is made up of the damping force generation unit 130, the rod 150, the cylinder 230, and the like) flows upward via the axial communication path 394 of the outer valve accommodation member 390. The oil, which has flown upward via the axial communication path 394 of the outer valve accommodation member 390, flows upward via the outer axial communication hole 389b of the inner valve accommodation member 380, and flows downward via the inner axial communication hole 389a that is opened. Thereafter, oil flows toward the reservoir chamber 40 via the first radial communication hole 397 of the outer valve accommodation member 390, and the discharge flow path 41 that is formed between the protruding portion 260b of the base member 260 and the lower end portion of the support member 400.

The following portions work as a first communication path R1 (refer to FIG. 11) through which the inside of the cylinder 230 communicates with the reservoir chamber 40: the axial communication hole 394 of the outer valve accommodation member 390; the outer axial communication hole 389b and the inner axial communication hole 389a of the inner valve accommodation member 380; the first radial communication hole 397 of the outer valve accommodation member 390; and the discharge flow path 41. The valve 317 attached to the operation rod 314, the coil spring 318, and the upper end surface of the inner valve accommodation member 380 work as a first communication path opening and closing valve V1 (refer to FIG. 11) that opens and closes the first communication path R1.

Figure 8:
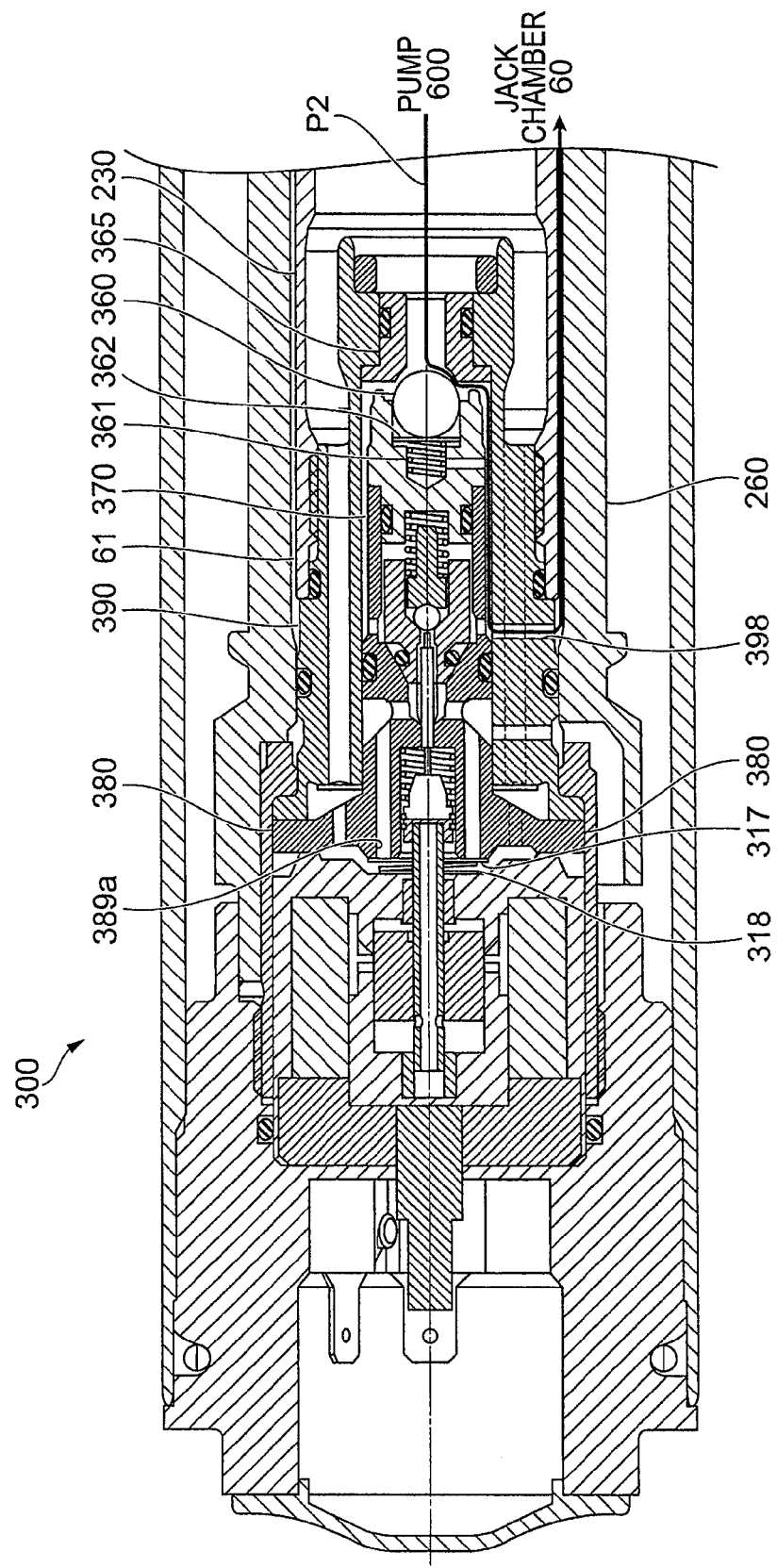
FIG. 8 is a view illustrating a circulation state of oil when a flow path switching unit is in a second switch state.

FIG. 8 is a view illustrating a circulation state of oil when the flow path switching unit 300 is in the second switch state.

When the flow path switching unit 300 is in the second switch state during the compression stroke of the front fork 21, as illustrated by arrow P2 in FIG. 8, the valve 317 attached to the operation rod 314 closes the inner axial communication hole 389a of the inner valve accommodation member 380, and thus oil discharged by the pump 600 flows toward the jack chamber 60. That is, the oil discharged by the pump 600 pushes the ball 360 upward while counteracting the biasing force of the coil spring 361, flows upward via the gap between the outer circumferential surfaces of the inner valve accommodation member 380 and the accommodation member 370 and the inner circumferential surface of the outer valve accommodation member 390, and flows toward the outside of the outer valve accommodation member 390 via the second radial communication hole 398 of the outer valve accommodation member 390. The oil, which has passed through the second radial communication hole 398, flows toward the jack chamber 60 via the annular flow path 61 that is formed between the outer circumferential surface of the cylinder 230 and the inner circumferential surface of the base member 260 of the spring-length changing unit 250.

The following portions work as a second communication path R2 (refer to FIG. 11) through which the inside of the cylinder 230 communicates with the jack chamber 60: the gap the outer circumferential surfaces of the inner valve accommodation member 380 and the accommodation member 370 and the inner circumferential surface of the outer valve accommodation member 390; the second radial communication path 398 of the outer valve accommodation member 390; and the annular flow path 61. The ball 360, the coil spring 361, the disk 362, and the ball seat member 365 work as a second communication path opening and closing valve V2 (refer to FIG. 11) that opens and closes the second communication path R2. The second communication path opening and closing valve V2 is a check valve that allows oil to flow into the jack chamber 60 from the cylinder 230, and prevents oil from flowing into the cylinder 230 from the jack chamber 60.

Figure 9:
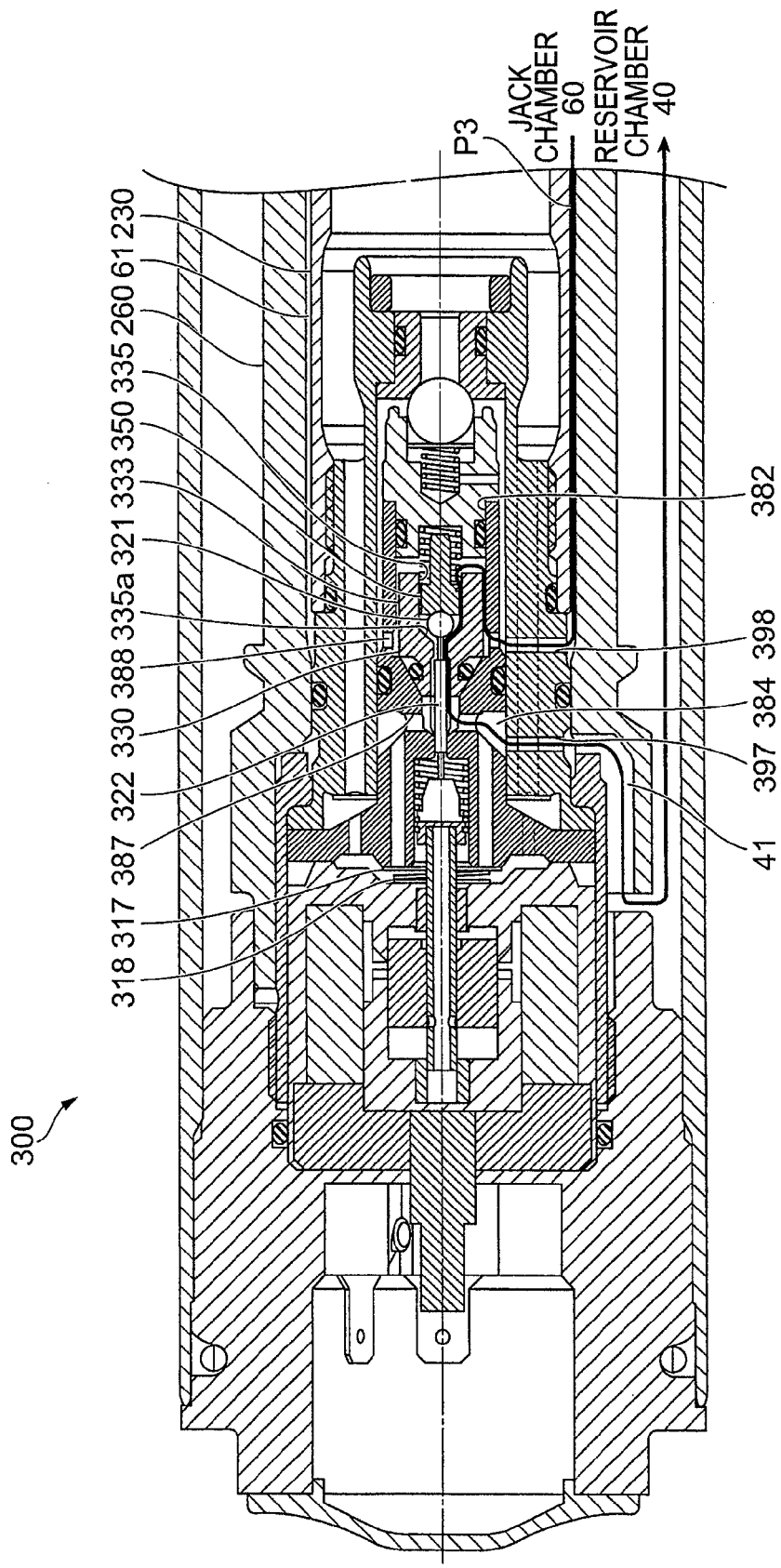
FIG. 9 is a view illustrating a circulation state of oil when a flow path switching unit is in a third switch state.

FIG. 9 is a view illustrating a circulation state of oil when the flow path switching unit 300 is in the third switch state.

When the flow path switching unit 300 is in the third switch state during the compression stroke of the front fork 21, as illustrated by arrow P3 in FIG. 9, oil in the jack chamber 60 flows toward the reservoir chamber 40. That is, the oil in the jack chamber 60 enters the lower end concave portion 382 of the inner valve accommodation member 380 via the annular flow path 61 that is formed between the outer circumferential surface of the cylinder 230 and the inner circumferential surface of the base member 260 of the spring-length changing unit 250; the second radial communication hole 398 of the outer valve accommodation member 390; and the second radial communication hole 388 of the inner valve accommodation member 380. The oil, which has entered the lower end concave portion 382 of the inner valve accommodation member 380, flows downward via the gap between the inner valve accommodation member 380 and the outer circumferential surface of the circular column-shaped portion 333 of the valve body seat member 330, and enters the lower end concave portion 335 of the valve body seat member 330. The oil, which has entered the lower end concave portion 335 of the valve body seat member 330, flows upward via the gaps between the push member 350, the valve body 321, the push rod 322, and the valve body seat member 330, and passes through the first radial communication hole 387 of the inner valve accommodation member 380. The oil, which has passed through the first radial communication hole 387 of the inner valve accommodation member 380, flows toward the reservoir chamber 40 via the first radial communication hole 397 of the outer valve accommodation member 390, and the discharge flow path 41 that is formed between the protruding portion 260b of the base member 260 and the lower end portion of the support member 400.

The following portions works as a third communication path R3 (refer to FIG. 11) through which the jack chamber 60 communicates with the reservoir chamber 40: the annular flow path 61; the second radial communication hole 398 of the outer valve accommodation member 390; the second radial communication hole 388 of the inner valve accommodation member 380; the gap between the inner valve accommodation member 380 and the outer circumferential surface of the circular column-shaped portion 333 of the valve body seat member 330; the push member 350; and the gaps between the valve body 321, the push rod 322, and the valve body seat member 330; the first radial communication hole 387 of the inner valve accommodation member 380; the first radial communication hole 397 of the outer valve accommodation member 390; and the discharge flow path 41. The valve body 321, and the inclined surface 335a of the lower end concave portion 335 of the valve body seat member 330 work as a third communication path opening and closing valve V3 (refer to FIG. 11) that opens and closes the third communication path R3.

Figure 10:
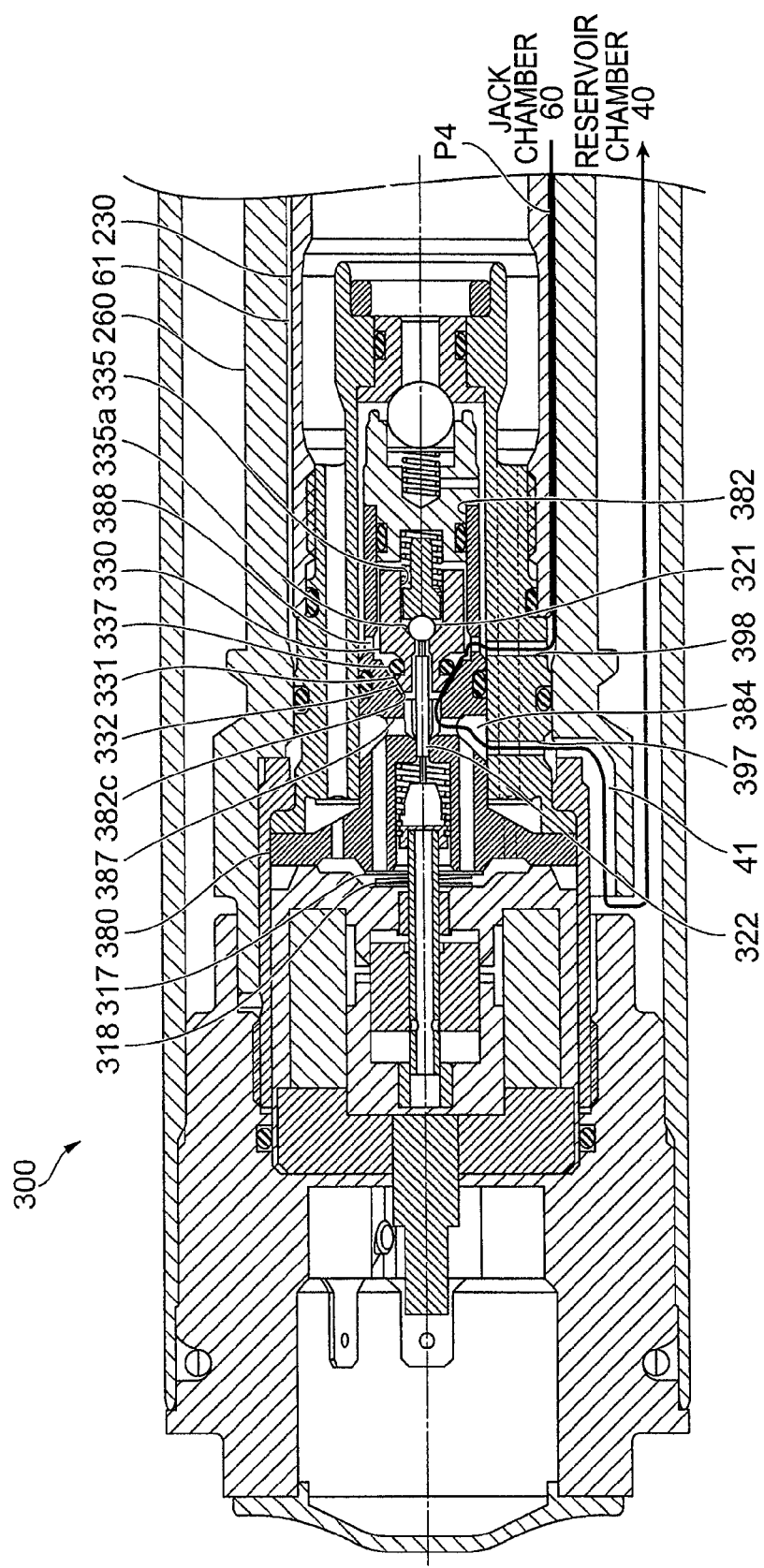
FIG. 10 is a view illustrating a circulation state of oil when a flow path switching unit is in a fourth switch state.

FIG. 10 is a view illustrating a circulation state of oil when the flow path switching unit 300 is in the fourth switch state.

When the flow path switching unit 300 is in the fourth switch state during the compression stroke of the front fork 21, as illustrated by arrow P4 in FIG. 10, oil in the jack chamber 60 flows toward the reservoir chamber 40. That is, the oil in the jack chamber 60 enters the lower end concave portion 382 of the inner valve accommodation member 380 via the annular flow path 61; the second radial communication hole 398 of the outer valve accommodation member 390; and the second radial communication hole 388 of the inner valve accommodation member 380. The oil, which has entered the lower end concave portion 382 of the inner valve accommodation member 380, flows upward via the gaps between the inclined surface 331 of the conical portion 332 of the valve body seat member 330, the O-ring 337, and the inclined surface of the conical concave portion 382c of the inner valve accommodation member 380, and passes through the first radial communication hole 387 of the inner valve accommodation member 380. The oil, which has passed through the first radial communication hole 387 of the inner valve accommodation member 380, flows toward the reservoir chamber 40 via the first radial communication hole 397 of the outer valve accommodation member 390, and the discharge flow path 41 that is formed between the protruding portion 260b of the base member 260 and the lower end portion of the support member 400.

The following portions works as a fourth communication path through which the jack chamber 60 communicates with the reservoir chamber 40: the annular flow path 61; the second radial communication hole 398 of the outer valve accommodation member 390; the second radial communication hole 388 of the inner valve accommodation member 380; the gaps between the inclined surface 331 of the valve body seat member 330, the O-ring 337, and the inclined surface of the conical concave portion 382c of the inner valve accommodation member 380; the first radial communication hole 387 of the inner valve accommodation member 380; the first radial communication hole 397 of the outer valve accommodation member 390; and the discharge flow path 41. The inclined surface 331 of the conical portion 332 of the valve body seat member 330, and the inclined surface of the conical concave portion 382c of the inner valve accommodation member 380 work as a fourth communication path opening and closing valve that opens and closes the fourth communication path.

Transition of Flow Path Switching Unit 300 from Third Switch State to Fourth Switch State When the flow path switching unit 300 is in the third switch state, and as illustrated by arrow P3 in FIG. 9, oil in the jack chamber 60 flows toward the reservoir chamber 40, the amount of oil in the jack chamber 60 decreases, the length of the spring 500 decreases, and the internal pressure of the jack chamber 60 decreases. As a result, the pressure of a back pressure chamber when the flow path switching unit 300 is in the third switch state decreases further than when the flow path switching unit 300 is in the second switch state, with the back pressure chamber being formed between the valve body seat member 330 and the accommodation member 370. Accordingly, the valve body seat member 330 starts to move downward.

When electric current supplied to the coil 311 of the solenoid 310 is higher than or equal to the third reference electric current, the push rod 322 moves the valve body 321 downward further than when the flow path switching unit 300 is in the third switch state, and thus the gap between the valve body 321 and the inclined surface 335a of the lower end concave portion 335 of the valve body seat member 330 increases. As a result, the internal pressure of the jack chamber 60 further decreases, and the pressure of the back pressure chamber further decreases. Accordingly, the valve body seat member 330 moves downward, and the inclined surface 331 of the conical portion 332 of the valve body seat member 330 moves away from the inclined surface of the conical concave portion 382c of the inner valve accommodation member 380. Therefore, the flow path switching unit 300 comes to the fourth switch state.

Open and Closed States of Communication Paths Depending on Switch State of Flow Path Switching Unit 300

Figure 11A:
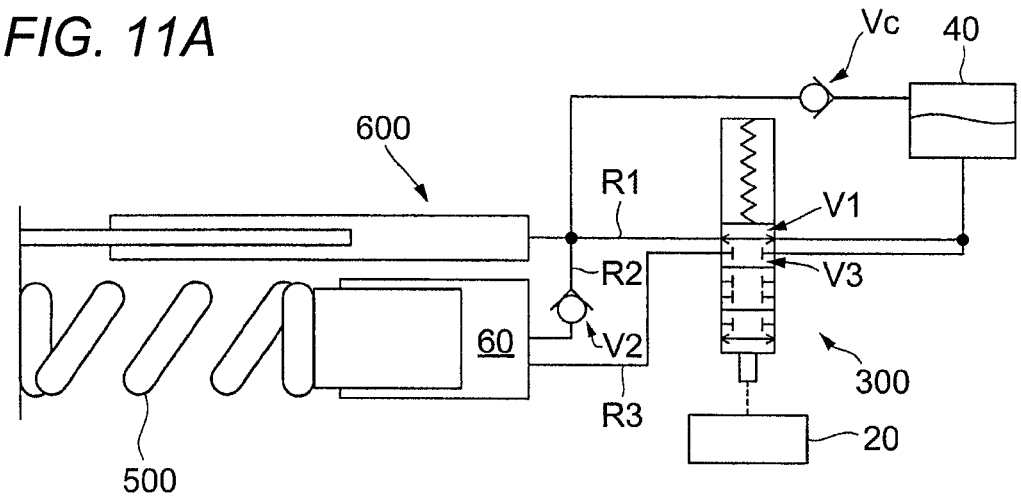
FIG. 11A is a schematic view illustrating open and closed states of a first communication path, a second communication path, and a third communication path when the flow path switching unit is in the first switch state.
Figure 11B:
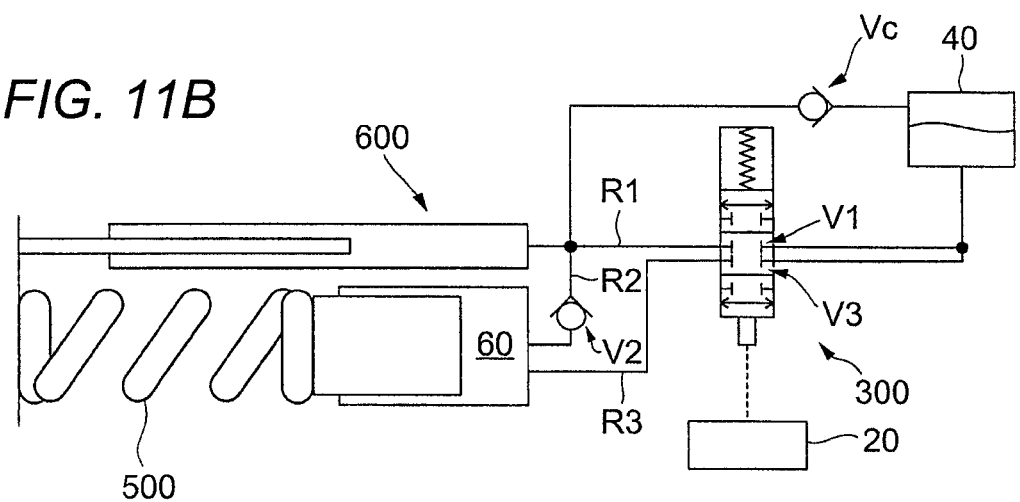
FIG. 11B is a schematic view illustrating open and closed states of the first communication path, the second communication path, and the third communication path when the flow path switching unit is in the second switch state.
Figure 11C:
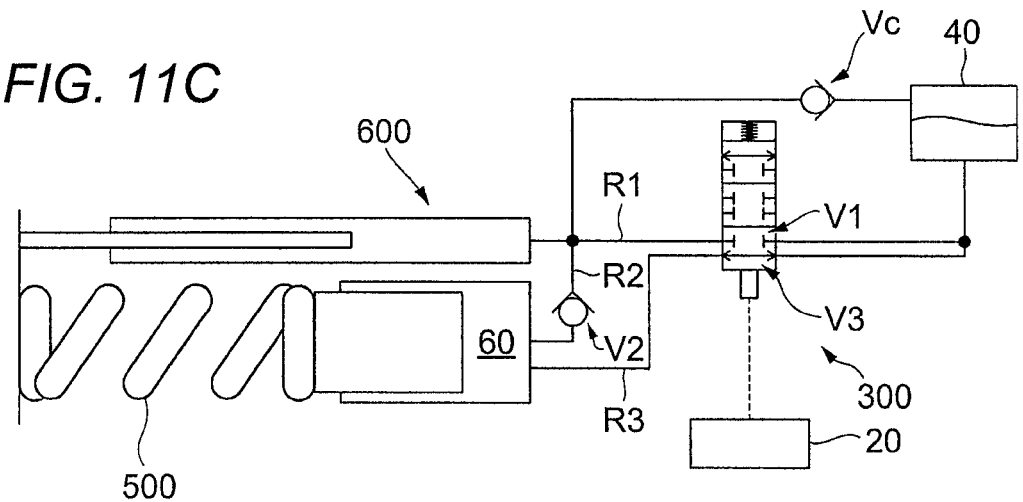
FIG. 11C is a schematic view illustrating open and closed states of the first communication path, the second communication path, and the third communication path when the flow path switching unit is in the third switch state.

FIG. 11A is a schematic view illustrating open and closed states of the first communication path R1, the second communication path R2, and the third communication path R3 when the flow path switching unit 300 is in the first switch state. FIG. 11B is a schematic view illustrating open and closed states of the first communication path R1, the second communication path R2, and the third communication path R3 when the flow path switching unit 300 is in the second switch state. FIG. 11C is a schematic view illustrating open and closed states of the first communication path R1, the second communication path R2, and the third communication path R3 when the flow path switching unit 300 is in the third switch state.

As illustrated in FIG. 11A, when the coil 311 of the solenoid 310 is energized with electric current that is lower than the first reference electric current, the flow path switching unit 300 comes to the first switch state, that is, the first communication path opening and closing valve V1 is opened, the third communication path opening and closing valve V3 is closed, and thus oil discharged by the pump 600 reaches the reservoir chamber 40 via the first communication path R1. In this case, since the pressure of the oil discharged by the pump 600 does not increase to the extent that the second communication path opening and closing valve V2 is opened, the oil discharged by the pump 600 does not flow through the second communication path R2. In other words, since the first communication path opening and closing valve V1 is open, the second communication path opening and closing valve V2 is closed. In the first switch state, the amount of oil in the jack chamber 60 neither increases nor decreases.

As illustrated in FIG. 11B, when the coil 311 of the solenoid 310 is energized with electric current that is higher than or equal to the first reference electric current, and is lower than the second reference electric current, the flow path switching unit 300 comes to the second switch state, that is, the first communication path opening and closing valve V1 and the third communication path opening and closing valve V3 are closed, and thus oil discharged by the pump 600 opens the second communication path opening and closing valve V2, and reaches the jack chamber 60 via the second communication path R2. In the second switch mode, the amount of oil in the jack chamber 60 increases.

As illustrated in FIG. 11C, when the coil 311 of the solenoid 310 is energized with electric current that is higher than or equal to the second reference electric current, and is lower than the third reference electric current, the flow path switching unit 300 comes to the third switch state, that is, the first communication path opening and closing valve V1 is closed, the third communication path opening and closing valve V3 is opened, and thus oil in the jack chamber 60 reaches the reservoir chamber 40 via the third communication path R3. In the third switch mode, the amount of oil in the jack chamber 60 decreases.

When the coil 311 of the solenoid 310 is energized with electric current that is higher than or equal to the third reference electric current, the flow path switching unit 300 comes to the fourth switch state, that is, the first communication path opening and closing valve V1 is closed, the fourth communication path opening and closing valve is opened, and thus oil in the jack chamber 60 reaches the reservoir chamber 40 via the fourth communication path.

A flow path, which is formed by the gaps between the inclined surface 331 of the conical portion 332 of the valve body seat member 330, the O-ring 337, and the inclined surface of the inner valve accommodation member 380 in the fourth switch state, is narrower than a flow path which is formed by the gap between the inner valve accommodation member 380 and the outer circumferential surface of the circular column-shaped portion 333 of the valve body seat member 330 in the third switch state. A flow path, which is formed by the gap between the valve body 321 and the inclined surface 335a of the valve body seat member 330 in the third switch state, is wider than a flow path which is formed by the gap between the inner valve accommodation member 380 and the outer circumferential surface of the circular column-shaped portion 333 of the valve body seat member 330 in the third switch state. Hence, the amount of oil in the jack chamber 60 in the fourth switch state decreases more quickly than that in the third switch state.

Regarding Raising and Lowering Vehicle Height

During the compression stroke of the front fork 21 that operates as described above, when the flow path switching unit 300 is in the second switch state, oil discharged by the pump 600 flows into the jack chamber 60, and the amount of oil in the jack chamber 60 increases. Due to an increase in the amount of oil in the jack chamber 60, the upper end support member 270 moves downward relative to the base member 260 of the spring-length changing unit 250. When the spring length of the spring 500 decreases due to the downward movement of the upper end support member 270 relative to the base member 260, a spring force of the spring 500 pushing the upper end support member 270 increases compared to that before the upper end support member 270 moves relative to the base member 260. As a result, even if force is applied to the front wheel 2 from the vehicle body frame 11, an initial set load (preload), at which a relative position between the front wheel 2 and the vehicle body frame 11 is not changed, increases. When the same force is applied to the front wheel 2 from the vehicle body frame 11 (a seat 19) in the axial direction, the amount of compression of the front fork 21 decreases. When the spring length of the spring 500 decreases due to the movement of the upper end support member 270 relative to the base member 260, the height of the seat 19 is raised (the vehicle height is raised) compared to that before the upper end support member 270 moves relative to the base member 260.

In contrast, when the flow path switching unit 300 is in the third switch state or the fourth switch state, the amount of oil in the jack chamber 60 decreases, and thus the upper end support member 270 moves upward relative to the base member 260 of the spring-length changing unit 250. When the spring length of the spring 500 increases due to the upward movement of the upper end support member 270 relative to the base member 260, a spring force of the spring 500 pushing the upper end support member 270 decreases compared to that before the upper end support member 270 moves relative to the base member 260. In this case, the initial set load (preload) decreases, and when the same force is applied from the vehicle body frame 11 (the seat 19) in the axial direction, the amount of compression of the front fork 21 increases. When the spring length of the spring 500 increases due to the upward movement of the upper end support member 270 relative to the base member 260, the height of the seat 19 is lowered (the vehicle height is lowered) compared to that before the upper end support member 270 moves relative to the base member 260. When the flow path switching unit 300 is in the fourth switch state, the amount of oil in the jack chamber 60 decreases more quickly than that in the third switch state, and thus the vehicle height is lowered more quickly than that in the third switch state.

When the flow path switching unit 300 is in the first switch state, oil discharged by the pump 600 during the compression stroke flows into the reservoir chamber 40, and thus the amount of oil in the jack chamber 60 neither increases nor decreases. Hence, the height of the seat 19 is maintained (the vehicle height is maintained).

As described above, the front fork 21 according to the embodiment includes the spring 500, the upper end portion and the lower end portion of which are respectively supported by the vehicle main body 10 and the front wheel 2, and the spring-length changing unit 250 that includes the jack chamber (accommodation chamber) 60 which accommodates oil (liquid), supports the upper end portion of the spring 500, and changes the length of the spring 500 according to the amount of oil in the jack chamber 60. The front fork 21 includes the pump 600 that includes the reservoir chamber (storage chamber) 40 and the cylinder 230 which store oil, suctions the oil in the reservoir chamber 40 into the cylinder 230 when the relative distance between the vehicle main body 10 and the front wheel 2 increases, and discharges the oil in the cylinder 230 when the relative distance between the vehicle main body 10 and the front wheel 2 decreases. The front fork 21 includes the flow path switching unit 300 that has the first communication path R1 through which the inside of the cylinder 230 communicates with the reservoir chamber 40; the second communication path R2 through which the inside of the cylinder 230 communicates with the jack chamber 60; and the third communication path R3 through which the jack chamber 60 communicates with the reservoir chamber 40, and switches the flow path of oil according to the amount of electric current supplied to the flow path switching unit 300. The flow path switching unit 300 includes the second communication path opening and closing valve V2 that is disposed on the second communication path R2, allows oil to flow into the jack chamber 60 from the cylinder 230, and prevents oil from flowing into the cylinder 230 from the jack chamber 60. According to the amount of the electric current supplied to the flow path switching unit 300, the flow path switching unit 300 switches between a state in which the first communication path R1 is opened, and the third communication path R3 is closed; a state in which the first communication path R1 and the third communication path R3 are closed; and a state in which the first communication path R1 is closed, and the third communication path R3 is opened.

When electric current supplied to the flow path switching unit 300 is higher than or equal to the first reference electric current, the flow path switching unit 300 enables communication between the inside of the cylinder 230 and the jack chamber 60 so that oil discharged by the pump 600 can be guided to the jack chamber 60, or enables communication between the jack chamber 60 and the reservoir chamber 40 so that oil in the jack chamber 60 can be guided to the reservoir chamber 40. Therefore, the vehicle height can be raised or lowered. In contrast, when electric current is not supplied to the flow path switching unit 300 due to malfunction, for example, power supply loss induced by an open circuit or the like, the inside of the cylinder 230 is set to communicate with the reservoir chamber 40 so that oil discharged by the pump 600 can be guided to the reservoir chamber 40. Therefore, oil discharged by the pump 600 is not guided to the jack chamber 60, and oil in the reservoir chamber 60 is not guided to the reservoir chamber 40. As a result, when electric current is not supplied to the flow path switching unit 300 due to malfunction or the like, the amount of oil in the jack chamber 60 neither increases nor decreases, and the vehicle height is maintained.

Accordingly, even if electric current is not supplied to the solenoid 310 of the flow path switching unit 300 during high-speed travelling due to malfunction or the like in a state where the vehicle height is raised, the front fork 21 of the embodiment can maintain the vehicle height. Hence, according to the front fork 21 of the embodiment, even if electric current is not supplied to the solenoid 310 of the flow path switching unit 300 during travelling due to malfunction or the like, a driver can tilt the vehicle body and adopt the same bank angle similarly to when the malfunction does not occur.

The flow path switching unit 300 of the embodiment has the first communication path R1 through which the inside of the cylinder 230 communicates with the reservoir chamber 40; the second communication path R2 through which the inside of the cylinder 230 communicates with the jack chamber 60; and the third communication path R3 through which the jack chamber 60 communicates with the reservoir chamber 40. When the electric current supplied to the flow path switching unit 300 is lower than the predetermined first reference electric current, the flow path switching unit 300 opens the first communication path R1, and closes the third communication path R3. When the electric current supplied to the flow path switching unit 300 is higher than or equal to the first reference electric current, the flow path switching unit 300 closes the first communication path R1 and the third communication path R3. When the electric current supplied to the flow path switching unit 300 is higher than or equal to the second reference electric current, the flow path switching unit 300 closes the first communication path R1, and opens the third communication path R3.

As such, the flow path switching unit 300 of the embodiment can open any communication path of the first communication path R1, the second communication path R2, and the third communication path R3 according to the amount of electric current supplied to the flow path switching unit 300. That is, the flow path switching unit 300 can raise, lower, or maintain the vehicle height by controlling the amount of axial movement of the operation rod 314 of the solenoid 310 according to the amount of electric current supplied to the flow path switching unit 300. In other words, the flow path switching unit 300 configured as a single unit can control three control modes according to the amount of electric current: a raising mode in which the vehicle height is raised; a lowering mode in which the vehicle height is lowered; and a maintaining mode in which the vehicle height is maintained.

The flow path switching unit 300 configured to realize the aforementioned function is attached to the upper end portion of the cylinder 230 while being disposed inside of the inner tube 210. That is, the flow path switching unit 300 is not disposed outside of the inner tube 210. The flow path switching unit 300 does not require a plurality of electromagnetic actuators (solenoids or the like) so as to realize the three control modes. Hence, according to the flow path switching unit 300 of the embodiment, it is possible to reduce a mounting space by simplifying the configuration of the front fork 21, and to realize the aforementioned function. In other words, the front fork 21 can switch between the three control modes without an increase in weight by applying the flow path switching unit 300 of the embodiment to the front fork 21 which has a limited surrounding space.

The flow path switching unit 300 of the embodiment enters the maintaining mode when the electric current supplied to the flow path switching unit 300 is lower than the first reference electric current, enters the raising mode when the supply electric current is higher than or equal to the first reference electric current, and is lower than the second reference electric current, and enters the lowering mode when the electric current supplied to the flow path switching unit 300 is higher than or equal to the second reference electric current. That is, the flow path switching unit 300 sequentially transitions from the maintaining mode, to the raising mode, and to the lowering mode when the amount of electric current supplied to the flow path switching unit 300 increases.

The flow path switching unit 300 of the embodiment does not sequentially transition from the maintaining mode, to the lowering mode, and to the raising mode when the amount of electric current supplied to the flow path switching unit 300 increases. In a case where the flow path switching unit 300 is configured to transition from the maintaining mode, to the lowering mode, and to the raising mode, when the amount of electric current is decreased so as to maintain a raised vehicle height, the amount of electric current is adjusted to the amount of electric current corresponding to the lower mode, and thus the vehicle height is lowered, which is a problem.

In contrast, since the flow path switching unit 300 of the embodiment sequentially transitions from the maintaining mode, to the raising mode, and to the lowering mode when the amount of electric current supplied to the flow path switching unit 300 increases, even if the amount of electric current is decreased so as to maintain a raised vehicle height, the vehicle height is not lowered.

Regarding Ease of Opening Third Communication Path Opening and Closing Valve V3

As described above, the valve body 321 and the inclined surface 335$a$ of the valve body seat member 330 work as the third communication path opening and closing valve V3, and the valve body 321 comes into contact with the inclined surface 335$a$ such that the third communication path R3 is closed. In a state where the third communication path R3 is closed, a sectional area (which is perpendicular to the axial direction) Sv (refer to FIG. 4) of a contact portion of the valve body 321 in contact with the inclined surface 335$a$ is a pressure receiving area that receives a force moving the valve body 321 upward (direction opposite to a push direction of the push rod 322). The force, which is applied to the valve body 321 upward, is obtained by multiplying to the sum of a spring force of the coil spring 340 and the internal pressure (internal pressure of the jack chamber 60) of the lower end concave portion 335 of the valve body seat member 330 by the sectional area Sv.

In contrast, the sectional area Sp of the third shaft portion 322$c$ of the push rod 322 is a pressure receiving area that receives the internal pressure (hereinafter, which is referred to as a "push rod back pressure") of the upper end concave portion 381 of the inner valve accommodation member 380. In other words, the sectional area Sp is a pressure receiving area receiving a force which is applied to the push rod 322 in a direction in which the push rod 322 pushes the valve body 321 because oil is discharged by the pump 600.

The sectional area Sv of the contact portion of the valve body 321 in contact with the inclined surface 335$a$ is substantially equal to the sectional area Sp of the third shaft portion 322$c$ of the push rod 322, or the sectional area Sv is larger than the sectional area Sp. In the embodiment, the sectional area Sv of the valve body 321 is substantially equal to the sectional area Sp of the push rod 322, or the sectional area Sv is set to be slightly larger than the sectional area Sp.

When the two-wheeled motorized vehicle 1 is overloaded with luggage that is heavier than expectation, the length of the spring 500 decreases, and even if the upper end support member 270 is present at the same position relative to the base member 260 of the spring-length changing unit 250, the pressure of oil in the jack chamber increases. As a result, the internal pressure of the lower end concave portion 335 (which accommodates the valve body 321) of the valve body seat member 330 increases, and thus the third communication path opening and closing valve V3 is unlikely to be opened. When the third communication path opening and closing valve V3 is unlikely to be opened, even if electric current higher than or equal to the second reference electric current is supplied to the coil 311 of the solenoid 310 of the flow path switching unit 300, the third communication path opening and closing valve V3 is not opened, and the vehicle height is not lowered, which is a problem.

In the embodiment, since the through hole 317a of the valve 317 is positioned to face the upper end concave portion 381 of the inner valve accommodation member 380, even if the flow path switching unit 300 is in the second switch state, in accordance with the extension and compression of the front fork 21, the push rod back pressure fluctuates in a range from pressure, which is lower than the internal pressure of the jack chamber 60, to pressure which is higher than the internal pressure of the jack chamber 60. Since the sectional area Sv of the valve body 321 is substantially equal to the sectional area Sp of the push rod 322, or the sectional area Sv is set to be slightly larger than the sectional area Sp, even if the flow path switching unit 300 is in the second switch state, the push rod 322 pushes the valve body 321 downward when the push rod back pressure becomes greater than the internal pressure of the jack chamber 60. For this reason, during the transition from the second switch state to the third switch state, the solenoid 310 generates a thrust force that is slightly greater than that in the second switch state, and thus the push rod 322 pushes the valve body 321 downward. That is, the solenoid 310 generates a thrust force that is slightly greater than that in the second switch state, and thus it is possible to open the third communication path opening and closing valve V3.

In the configuration of the embodiment, even if a load required to open the third communication path opening and closing valve V3 increases due to an unexpected factor such as the sticking of the valve body 321 induced by overload or a non-operation for a long time, it is possible to easily open the third communication path opening and closing valve V3 using the discharge pressure of the pump 600.

The sectional area Sv of the valve body 321 may be set to be slightly larger than the sectional area Sp of the push rod 322 in such a way that the push rod 322 does not push the valve body 321 downward when the flow path switching unit 300 is in the second switch state, and the push rod back pressure becomes greater than the internal pressure of the jack chamber 60.

Modification Example of Flow Path Switching Unit 300

The solenoid 310 of the embodiment generates and applies an axial thrust force to the plunger 313 in such a way that the amount of protrusion of the operation rod 314 from the case 315 increases to the extent that energization current to the coil 311 increases; however, particularly, the present invention is not limited to this. For example, the solenoid 310 may generate and apply an axial thrust force to the plunger 313 in such a way that the amount of protrusion of the operation rod 314 from the case 315 decreases to the extent that energization current to the coil 311 increases. The flow path switching unit 300 with this configuration as a single unit can control the three control modes according to the amount of electric current: the raising mode in which the vehicle height is raised; the lowering mode in which the vehicle height is lowered; and the maintaining mode in which the vehicle height is maintained.

When electric current is not supplied to the flow path switching unit 300 due to malfunction, for example, power supply loss induced by an open circuit or the like, the operation rod 314 protrudes from the case 315 the maximum distance, the push rod 322 pushes the valve body 321 downward, and the valve body 321 moves away from the inclined surface 335a of the lower end concave portion 335 of the valve body seat member 330. As a result, oil in the jack chamber 60 decreases, and the vehicle height is lowered. Hence, even if electric current is not supplied to the solenoid 310 of the flow path switching unit 300 due to malfunction when the two-wheeled motorized vehicle 1 is travelling while the vehicle height is raised, it is possible to lower the vehicle height, and it is possible for a driver to easily get on and off the two-wheeled motorized vehicle 1 at a stop. Since the vehicle height is reliably lowered at ignition off, the driver can easily get on and off the two-wheeled motorized vehicle 1.

In the embodiment, the flow path switching unit 300, which can switch between the three control modes, that is, the raising mode, the lowering mode, and the maintaining mode, is applied to the front fork 21; however, the present invention is not limited to that configuration in the embodiment. The flow path switching unit 300 of the embodiment may be applied to the rear suspension 22.

What is claimed is:

1. A vehicle height adjustment apparatus comprising:
   a spring having one end supported at a side of a body of a vehicle and another end supported at a side of a wheel of the vehicle;
   an adjustor that comprises an accommodation chamber which accommodates liquid, and adjusts a length of the spring according to an amount of liquid in the accommodation chamber;
   a storage chamber that stores the liquid;
   a pump that comprises a cylinder and is configured to suction the liquid in the storage chamber into the cylinder when a relative distance between the body and the wheel increases, and discharge the liquid in the cylinder when the relative distance between the body and the wheel decreases; and
   a flow path switching unit that comprises a first communication path through which an inside of the cylinder communicates with the storage chamber; a second communication path through which the inside of the cylinder communicates with the accommodation chamber; and a third communication path through which the accommodation chamber communicates with the storage chamber, and switches a flow path of the liquid between the first communication path, the second communication path and the third communication path according to an amount of electric current supplied to the flow path switching unit.

2. The vehicle height adjustment apparatus according to claim 1,
   wherein the flow path switching unit comprises a second communication path opening and closing valve that is disposed on the second communication path, allows the liquid to flow into the accommodation chamber from the cylinder, and prevents the liquid from flowing into the cylinder from the accommodation chamber, and wherein according to the amount of the electric current supplied to the flow path switching unit, the flow path switching unit switches between a state in which the first communication path is opened, and the third communication path is closed; a state in which the first communication path and the third communication path are closed; and a state in which the first communication path is closed, and the third communication path is opened.

3. The vehicle height adjustment apparatus according to claim 2,
wherein the flow path switching unit further comprises:
a solenoid that comprises an operation rod that protrudes from a case by an amount that is changed according to the amount of the electric current supplied to the flow path switching unit and a plate-like valve which is attached to the operation rod;
a valve body that rests on a resting surface; and
a push rod which is pushed by the operation rod of the solenoid so that the push rod moves,
wherein when the amount of protrusion of the operation rod of the solenoid from the case is greater than or equal to a first reference amount, the operation rod protrudes to a position in which the valve closes the first communication path, and
wherein when the amount of protrusion of the operation rod of the solenoid from the case is greater than or equal to a second reference amount which is predetermined to be greater than the first reference amount, the push rod is pushed by the operation rod, pushes the valve body so that the valve body moves away from the resting surface, and thereby the third communication path is opened.

4. The vehicle height adjustment apparatus according to claim 3,
wherein when the amount of protrusion of the operation rod of the solenoid from the case is less than the first reference amount, the flow path switching unit opens the first communication path, and guides the liquid, which is discharged by the pump, to the storage chamber.

5. The vehicle height adjustment apparatus according to claim 4,
wherein the push rod receives a pressure of the liquid discharged by the pump so that the push rod moves in a direction to push the valve body.

6. The vehicle height adjustment apparatus according to claim 5,
wherein a pressure receiving area of the push rod is equal to a pressure receiving area of the valve body, or the pressure receiving area of the valve body is larger than the pressure receiving area of the push rod, with the pressure receiving area of the push rod receiving a force that is applied to the push rod in the direction to push the valve body due to that the liquid is discharged by the pump, and with the pressure receiving area of the valve body receiving a force that is applied to the valve body in contact with the resting surface in a direction opposite to the direction to push the valve body.

7. The vehicle height adjustment apparatus according to claim 3,
wherein the push rod receives a pressure of the liquid discharged by the pump so that the push rod moves in a direction to push the valve body.

8. The vehicle height adjustment apparatus according to claim 7,
wherein a pressure receiving area of the push rod is equal to a pressure receiving area of the valve body, or the pressure receiving area of the valve body is larger than the pressure receiving area of the push rod, with the pressure receiving area of the push rod receiving a force that is applied to the push rod in the direction to push the valve body due to that the liquid is discharged by the pump, and with the pressure receiving area of the valve body receiving a force that is applied to the valve body in contact with the resting surface in a direction opposite to the direction to push the valve body.

9. The vehicle height adjustment apparatus according to claim 1,
wherein the flow path switching unit further comprises:
a solenoid that comprises an operation rod that protrudes from a case by an amount that is changed according to the amount of the electric current supplied to the flow path switching unit and a plate-like valve which is attached to the operation rod;
a valve body that rests on a resting surface; and
a push rod which is pushed by the operation rod of the solenoid so that the push rod moves,
wherein when the amount of protrusion of the operation rod of the solenoid from the case is greater than or equal to a first reference amount, the operation rod protrudes to a position in which the valve closes the first communication path, and
wherein when the amount of protrusion of the operation rod of the solenoid from the case is greater than or equal to a second reference amount which is predetermined to be greater than the first reference amount, the push rod is pushed by the operation rod, pushes the valve body so that the valve body moves away from the resting surface, and thereby the third communication path is opened.

10. The vehicle height adjustment apparatus according to claim 9,
wherein when the amount of protrusion of the operation rod of the solenoid from the case is less than the first reference amount, the flow path switching unit opens the first communication path, and guides the liquid, which is discharged by the pump, to the storage chamber.

11. The vehicle height adjustment apparatus according to claim 10,
wherein the push rod receives a pressure of the liquid discharged by the pump so that the push rod moves in a direction to push the valve body.

12. The vehicle height adjustment apparatus according to claim 11,
wherein a pressure receiving area of the push rod is equal to a pressure receiving area of the valve body, or the pressure receiving area of the valve body is larger than the pressure receiving area of the push rod, with the pressure receiving area of the push rod receiving a force that is applied to the push rod in the direction to push the valve body due to that the liquid is discharged by the pump, and with the pressure receiving area of the valve body receiving a force that is applied to the valve body in contact with the resting surface in a direction opposite to the direction to push the valve body.

13. The vehicle height adjustment apparatus according to claim 9,
wherein the push rod receives a pressure of the liquid discharged by the pump so that the push rod moves in a direction to push the valve body.

14. The vehicle height adjustment apparatus according to claim 13,
  wherein a pressure receiving area of the push rod is equal to a pressure receiving area of the valve body, or the pressure receiving area of the valve body is larger than the pressure receiving area of the push rod, with the pressure receiving area of the push rod receiving a force that is applied to the push rod in the direction to push the valve body due to that the liquid is discharged by the pump, and with the pressure receiving area of the valve body receiving a force that is applied to the valve body in contact with the resting surface in a direction opposite to the direction to push the valve body.

* * * * *